(12) United States Patent
Kase

(10) Patent No.: US 10,946,574 B2
(45) Date of Patent: Mar. 16, 2021

(54) DISCHARGE CONTAINER FOR DISCHARGING CONTENTS ONTO DISCHARGE SURFACE

(71) Applicants: YOSHINO KOGYOSHO CO., LTD., Tokyo (JP); Mai Kase, Tokyo (JP)

(72) Inventor: Mai Kase, Tokyo (JP)

(73) Assignee: YOSHINO KOGYOSHO CO., LTD., Tokyo (JP)

( * ) Notice: Subject to any disclaimer, the term of this patent is extended or adjusted under 35 U.S.C. 154(b) by 379 days.

(21) Appl. No.: 16/065,472

(22) PCT Filed: Dec. 22, 2016

(86) PCT No.: PCT/JP2016/088423
§ 371 (c)(1),
(2) Date: Jun. 22, 2018

(87) PCT Pub. No.: WO2017/111050
PCT Pub. Date: Jun. 29, 2017

(65) Prior Publication Data
US 2019/0001545 A1 Jan. 3, 2019

(30) Foreign Application Priority Data

Dec. 25, 2015 (JP) ............................. JP2015-254855

(51) Int. Cl.
*B29C 48/285* (2019.01)
*B29C 48/12* (2019.01)
(Continued)

(52) U.S. Cl.
CPC ............. *B29C 48/285* (2019.02); *B05B 1/14* (2013.01); *B29C 48/12* (2019.02); *B29C 48/21* (2019.02);
(Continued)

(58) Field of Classification Search
CPC ...... B05B 1/14; B65D 83/753; B65D 83/205; B65D 83/40; B29L 2031/7022;
(Continued)

(56) References Cited

U.S. PATENT DOCUMENTS 3,726,444 A * 4/1973 Ostrowsky ........... B65D 83/206
222/402.11
3,790,331 A 2/1974 Backer
(Continued)

FOREIGN PATENT DOCUMENTS

GB    1170341 A    11/1969
GB    2220989 A    1/1990
(Continued)

OTHER PUBLICATIONS

Feb. 7, 2017 International Search Report issued in International Patent Application No. PCT/JP2016/088423.
(Continued)

*Primary Examiner* — Lien M Ngo
(74) *Attorney, Agent, or Firm* — Oliff PLC

(57) ABSTRACT

The present invention discloses a discharge container that is provided with the following: a container body in which contents are stored; a securing member; a discharge vessel including a stem; an exterior section including a top wall section penetrated by molded holes and that discharges the contents from the perforation holes onto a discharge surface of the top wall section; and an inner plate which is provided so as to be freely movable inside the exterior section and which forms a diffusion chamber in the space that is formed with a supply surface of the top wall section.

5 Claims, 23 Drawing Sheets

(51) Int. Cl.
*B29C 48/21* (2019.01)
*B29C 48/255* (2019.01)
*B65D 83/14* (2006.01)
*B65D 83/20* (2006.01)
*B05B 1/14* (2006.01)
*B29C 48/025* (2019.01)
*B29C 48/25* (2019.01)
*B29C 48/345* (2019.01)
*B65D 83/40* (2006.01)
*B05B 11/00* (2006.01)
*B29L 31/00* (2006.01)

(52) U.S. Cl.
CPC ........ *B29C 48/2552* (2019.02); *B65D 83/205* (2013.01); *B65D 83/753* (2013.01); *B05B 11/3053* (2013.01); *B29C 48/025* (2019.02); *B29C 48/266* (2019.02); *B29C 48/2694* (2019.02); *B29C 48/345* (2019.02); *B29L 2031/7022* (2013.01); *B65D 83/40* (2013.01)

(58) Field of Classification Search
CPC ....... B29C 48/285; B29C 48/12; B29C 48/21; B29C 48/2552; B29C 48/025; B29C 48/266; B29C 48/345; B29C 48/2694
USPC ............... 222/402.13, 402.1, 402.15, 402.11
See application file for complete search history.

(56) References Cited

U.S. PATENT DOCUMENTS

| | | | |
|---|---|---|---|
| 4,341,348 A | 7/1982 | Dearling | |
| 5,813,785 A | 9/1998 | Baudin et al. | |
| 6,283,337 B1 * | 9/2001 | Nakamura | B65D 83/285 222/402.1 |
| 2007/0090133 A1 * | 4/2007 | Macleod | B65D 83/206 222/402.13 |
| 2015/0320948 A1 | 11/2015 | Eicher et al. | |

FOREIGN PATENT DOCUMENTS

| | | |
|---|---|---|
| JP | S59-16385 U | 1/1984 |
| JP | S60-116433 A | 6/1985 |
| JP | S61-55959 U | 4/1986 |
| JP | S62-160158 A | 7/1987 |
| JP | H01-103554 U | 7/1989 |
| JP | 2000-327055 A | 11/2000 |
| JP | 2002-080080 A | 3/2002 |
| JP | 2002-320885 A | 11/2002 |
| JP | 2006-290408 A | 10/2006 |
| JP | 2010-269233 A | 12/2010 |
| JP | 2013-241203 A | 12/2013 |
| JP | 2013-256316 A | 12/2013 |
| JP | 2014-009004 A | 1/2014 |
| JP | 2016-050002 A | 4/2016 |

OTHER PUBLICATIONS

Dec. 12, 2017 Office Action issued in Japanese Patent Application No. 2014-133923.
Dec. 19, 2017 Office Action issued in Japanese Patent Application No. 2014-176117.
Jul. 22, 2019 extended European Patent Application No. 16878936.0.
Oct. 19, 2018 Office Action issued in U.S. Appl. No. 15/386,758.
Nov. 13, 2018 Office Action issued in Japanese Patent Application No. 2015-130079.
Mar. 26, 2019 Office Action issued in Japanese Patent Application No. 2015-130079.

* cited by examiner

DISCHARGE CONTAINER FOR DISCHARGING CONTENTS ONTO DISCHARGE SURFACE

TECHNICAL FIELD

The present invention relates to a discharge container for discharging contents onto a discharge surface. Priority is claimed on Japanese Patent Application No. 2015-254855, filed Dec. 25, 2015, the content of which is incorporated herein by reference.

BACKGROUND ART

Conventionally, for example, a discharge container as shown in the following Patent Document 1 is known. This discharge container has a saucer which stores liquid (contents) suctioned up above an internal piston. A communication hole which communicates with the internal piston and a receiving plate located above the communication hole are provided at the saucer. The receiving plate is connected to a circumferential edge of the communication hole via a plurality of legs provided at intervals in the circumferential direction of the communication hole. A liquid outlet hole which discharges the liquid suctioned up above the internal piston onto an upper surface (discharge surface) of the saucer is formed between the fixing legs that are adjacent in the circumferential direction.

CITATION LIST

Patent Document

[Patent Document 1]
Japanese Unexamined Utility Model Application, First Publication No. H1-103554

SUMMARY OF INVENTION

Technical Problem

However, in the conventional discharge container, when the contents are discharged, the saucer onto which the contents are discharged is pressed downward. Therefore, the contents may adhere to the hand, the saucer may wobble with respect to the internal piston, and the contents discharged to the saucer may spill out.

The present invention has been made in view of the above problems, and it is an object of the present invention to provide a discharge container capable of preventing contents from adhering to the hand or spilling out when the contents are discharged.

Solution to Problem

In order to achieve the aforementioned objects, the present invention proposes the following means. According to a first aspect of the present invention, there is provided a discharge container including a container body in which contents are stored, a discharger including a stem provided upright in a mouth portion of the container body to be movable downward in a state where the stem is pushed upward, an exterior portion including a top wall portion which is disposed above the stem and through which a discharge hole passes in a vertical direction, and the exterior portion being configured to discharge the contents from the discharge hole to a discharge surface of the top wall portion facing upward, and an inner plate provided in the exterior portion to be movable, wherein the exterior portion is attached to the container body, a locking portion configured to be locked to the stem and move down the stem as the inner plate moves down and a push-down portion which protrudes toward an outside in a radial direction are provided on the inner plate, and the pushing-down portion is disposed on an outside of the exterior portion through an insertion hole formed in a circumferential wall portion of the exterior portion.

According to the first aspect, the pushing-down portion that is pushed down when the contents are discharged is provided in an inner plate different from the exterior portion having the discharge surface onto which the contents are discharged. Therefore, it is possible to discharge the contents without being in contact with the discharge surface of the exterior portion and to prevent the contents from adhering to the hands, and it is possible to minimize wobbling of the exterior portion and to prevent spilling-out of the contents from the discharge surface.

A second aspect of the present invention is a discharge container according to the first aspect, where the inner plate includes an inner plate main body disposed in the exterior part, and the pushing-down portion comprises a side plate of which a front surface and a back surface extend along an outer circumferential surface of the exterior portion, a pushing-down plate which protrudes toward the outside in the radial direction from the side plate and of which a front surface and a back surface are directed in the vertical direction, and a coupling plate which connects the side plate with the inner plate main body and is inserted into the insertion hole.

According to the second aspect, the pushing-down portion has the side plate extending along the outer circumferential surface of the exterior portion, and the pushing-down plate protruding toward the outside in the radial direction is connected to the coupling plate via the side plate. Therefore, it is easy to ensure bending rigidity of the entire pushing-down portion in the vertical direction, and the durability thereof can be improved.

A third aspect of the present invention is the discharge container according to the first or second aspect, where the pushing-down plate is disposed over an entire circumference of the circumferential wall portion of the exterior portion. According to the third aspect, the pushing-down plate is disposed over the entire circumference of the circumferential wall portion of the exterior portion. Accordingly, for example, it is not necessary to change the circumferential direction of the discharge container when the contents are discharged, and excellent operability can be provided.

A fourth aspect of the present invention is a discharge container according to any one of the first to third aspect, where the inner plate forms a diffusion chamber, which is configured to diffuse the contents from the stem in the radial direction and supply the contents to the discharge hole, between the inner plate and the supply surface facing downward in the top wall portion. According to the fourth aspect, since the contents in the container body are diffused in the radial direction in the diffusion chamber and then supplied to the discharge hole, it is possible to minimize concentration of the contents on the discharge holes disposed in a specific part of the discharge surface and to supply the contents to the discharge boles with less variation. Therefore, it is possible to minimize the variation in a discharge amount of the contents discharged onto the discharge surface at each position.

A fifth aspect of the present invention is a discharge container according to the first aspect, where the inner plate forms a diffusion chamber, which is configured to diffuse the contents from the stem in the radial direction and supply the contents to the discharge hole, between the inner plate and the supply surface facing downward in the top wall portion, the pushing-down portion includes a locking protrusion portion, and a pushing-down plate which extends in the vertical direction, of which a lower end portion is connected to the locking protrusion portion via a hinge portion, and of which a front surface and a back surface are directed in the radial direction, the pushing-down plate is disposed on the outside of the exterior portion through the insertion hole and is disposed to be movable around the hinge portion to be in a use posture in which a front surface and a back surface of the pushing-down plate are directed in the vertical direction, a locked protrusion portion configured to be locked to a lower surface of the locking protrusion portion when in a use posture is formed at a lower end portion of the pushing-down plate, a restricting wall disposed in a state in which a gap is formed between the restricting wall and the circumferential wall portion of the exterior portion is provided in the container body, and the inner plate is disposed to be rotatable with respect to the container body in a circumferential direction such that the pushing-down plate moves forward and backward with respect to the gap.

According to the fifth aspect, when the contents are discharged onto the discharge surface of the exterior portion, the inner plate is rotated in the circumferential direction, the pushing-down plate is moved to a position which deviates from the gap between the restricting wall and the circumferential wall portion of the exterior portion, and the pushing-down plate is moved around the hinge portion so that the front and back surfaces face upward and downward to bring the pushing-down plate into the use posture. An internal volume of the diffusion chamber located between the top wall portion of the exterior portion and the inner plate is increased and the locking portion of the inner plate is locked to the stem by pushing down the pushing-down plate in the use posture. Furthermore, as the inner plate moves down, the stem locked to the locking portion is moved down against an upward pushing force, whereby the contents in the container body flow into the diffusion chamber through the stem. The contents that have flowed into the diffusion chamber are diffused in the radial direction in the diffusion chamber, then supplied to the discharge holes and discharged onto the discharge surface from the discharge holes.

Further, according to the fifth aspect, since the contents in the container body are supplied to the discharge hole after being diffused in the radial direction in the diffusion chamber, it is possible to minimize the concentration of the contents on the discharge holes arranged in a specific part of the discharge surface and to supply the contents to the discharge holes with less variation. Therefore, it is possible to minimize the variation in the discharge amount of the contents discharged onto the discharge surface at each position.

Further, according to the fifth aspect, since the pushing-down plate is set to be in the use posture only when the contents are discharged, the pushing-down plate can be moved into and accommodated in the gap between the restricting wall and the circumferential wall portion of the exterior portion in a posture in which the front and back surfaces are directed in the radial direction when the discharge container is not in use, for example, in a distribution stage. Accordingly, it is possible to reduce a dimension of the discharge container in the radial direction when not in use. On the other hand, since it is possible to enlarge an length of the pushing-down plate protruding toward the outside in the radial direction at the time of use, it is possible to easily push down the pushing-down plate. Also, when the pushing-down plate is in the use posture, the locked protrusion portion of the pushing-down plate is locked to the lower surface of the locking protrusion portion, and the downward rotation of the pushing-down plate about the hinge portion is restricted. Therefore, it is possible to reliably move down the inner plate by pushing down the pushing-down plate.

A sixth aspect of the present invention is a discharge container according to the fourth or fifth aspect, where the inner plate is disposed to be movable between an upper standby position in which the inner plate is in contact with or close to the supply surface and a lower discharge position in which the locking portion is locked to the stem and the stem is moved down to supply the contents from the stem into the diffusion chamber, and a pushing member which pushes the inner plate located at the discharge position upward to the standby position is provided between the container body and the inner plate.

According to the sixth aspect, when the pushing-down plate is pushed downward in the state in which the inner plate is in the standby position, the inner plate is moved down against the upward pushing force of the pushing member, the internal volume of the diffusion chamber formed between the supply surface of the exterior portion and the inner plate increases, and the locking portion of the inner plate is locked to the stem. When the inner plate is further moved down in the pushing-down operation, the locking portion moves down the stem against the upward pushing force as the inner plate moves down, the inner plate is disposed at the discharge position, and the contents in the container body flow into the diffusion chamber through the stem.

Thereafter, when the pushing-down operation of the pushing-down plate is released, the upward pushing force of the inner plate by the pushing member and the upward pushing force of the stem cause the inner plate and the stein to be moved upward and to be displaced and restored, and the inner plate is returned to the standby position. At this time, since the inner plate is in contact with or comes close to the top wall portion of the exterior portion, even if the contents remain in the diffusion chamber before the inner plate is moved upward, the contents are pushed out from the diffusion chamber to the discharge surface. That is, the inner plate is restored to its initial position by releasing the pushing-down operation of the pushing-down plate, and thus the content remaining in the diffusion chamber can be pushed out from the diffusion chamber. Accordingly, a remaining amount of the contents in the exterior portion can be reduced. In this way, for example, it is possible to make it easy to keep the inside of the exterior portion clean by reducing the remaining amount of the contents in the exterior portion.

Advantageous Effects of Invention

According to the present invention, it is possible to prevent contents from adhering to the hand or spilling-out when the contents are discharged.

DESCRIPTION OF EMBODIMENTS

First Embodiment

Hereinafter, a discharge container according to a first embodiment of the present invention will be described with reference to the drawings.

Figure 1:
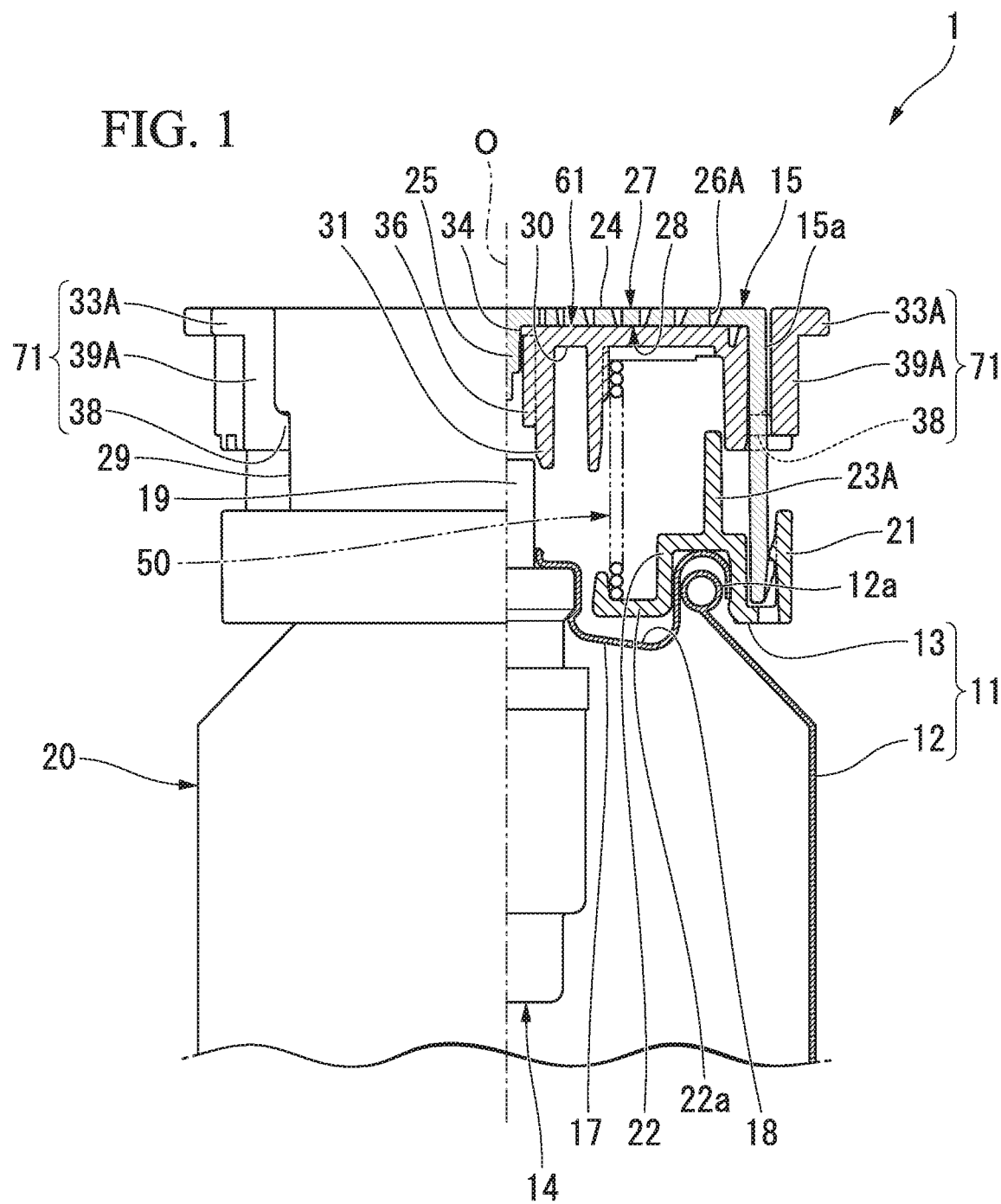
FIG. 1 is a longitudinal half sectional view of a main part of a discharge container according to a first embodiment of the present invention and is a view showing a state in which an inner plate is located at a standby position.
Figure 2:
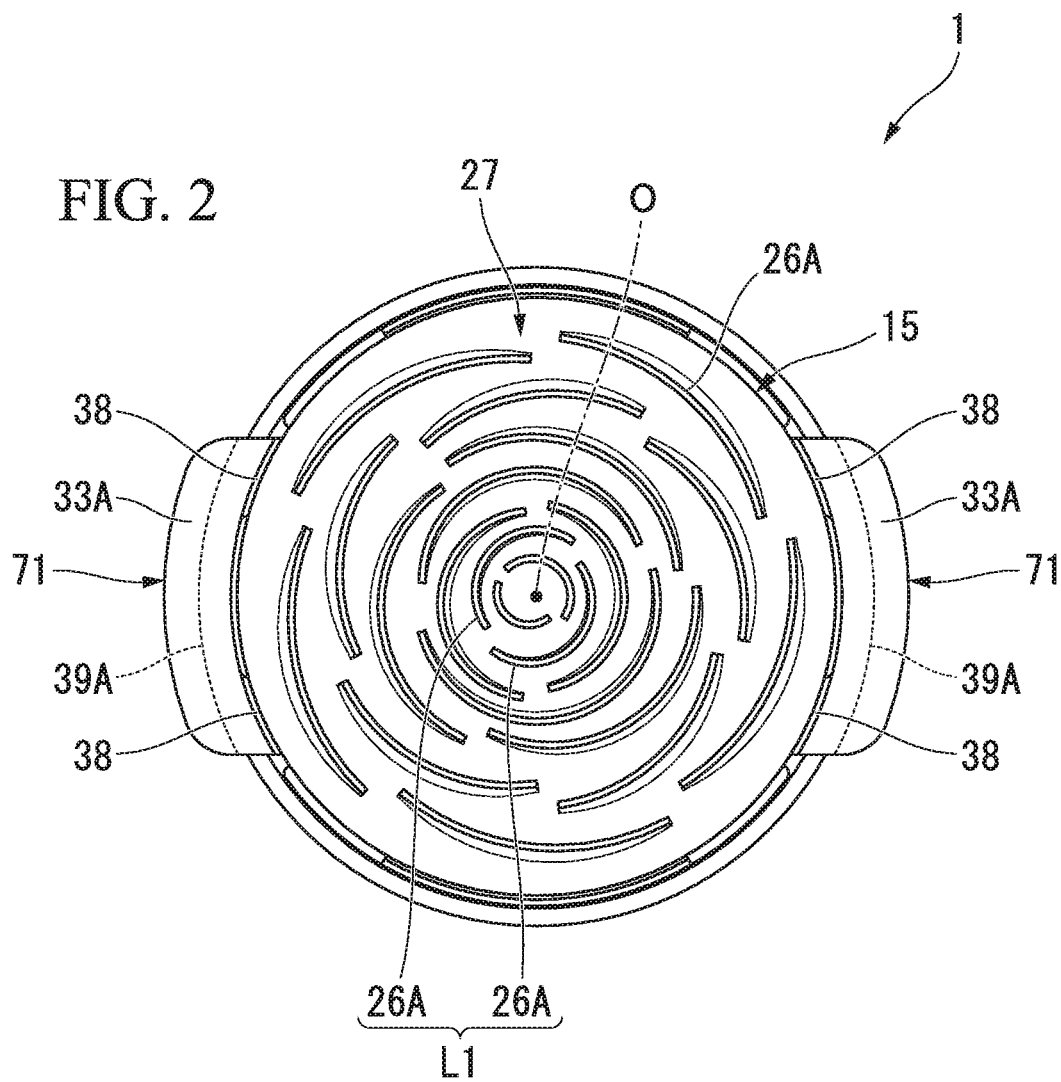
FIG. 2 is a top view of the discharge container shown in FIG. 1.
Figure 4:
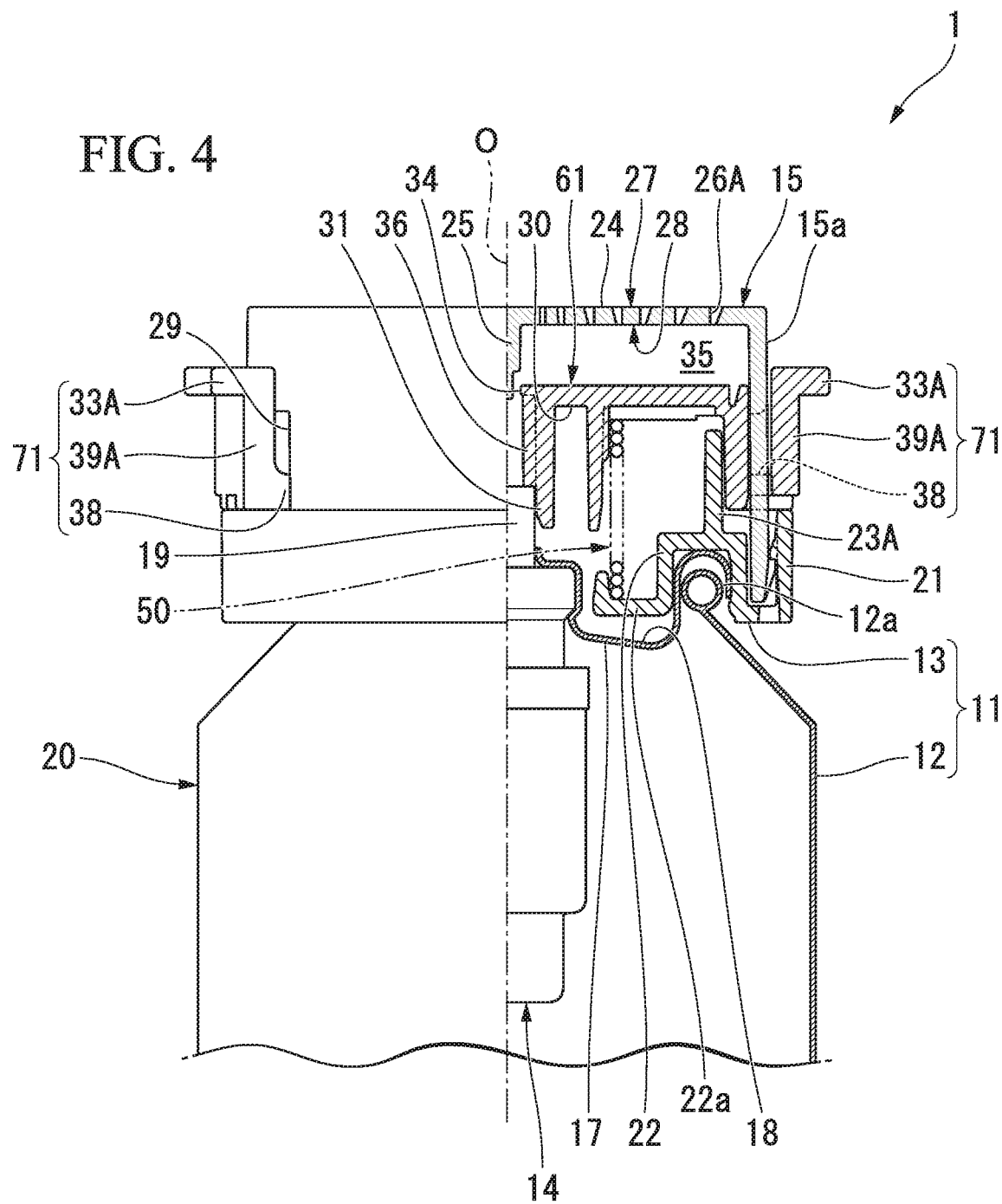
FIG. 4 is a longitudinal half sectional view of the main part of the discharge container shown in FIG. 1 and is a view showing a state in which the inner plate is moved down to a discharge position.

As shown in FIGS. 1 and 4, a discharge container 1 includes a container body 11, a discharger 14, an exterior portion 15, and an inner plate 61. The discharge container 10 discharges contents that can hold its shape for at least a certain time after discharge such as a foamed material and a high viscous material. The container body 11 includes a container main body 12 in which the contents are stored, and a fixing member 13 attached to a mouth portion 12a of the container main body 12.

Here, in the embodiment, the container main body 12 is formed in a cylindrical shape with a bottom, and the exterior portion 15 is formed in a cylindrical shape with a top, and central axes of the container main body 12 and the exterior portion 15 are disposed on a common axis. Hereinafter, this common axis is referred to as a container axis O, a side of the bottom of the container main body 12 in a direction along the container axis O is referred to as a lower side, a side of the mouth portion 12a of the container main body 12 is referred to as an upper side, and a direction along the container axis O is referred to as a vertical direction. In a top view of the discharge container 10, a direction orthogonal to the container axis O is referred to as a radial direction, and a direction of circling around the container axis O is referred to as a circumferential direction.

The container main body 12 is hermetically sealed by covering the mouth portion 12a of the container main body 12 with a top wall 17. An annular concave portion 18 extending in the circumferential direction is provided in the top wall 17. The annular concave portion 18 is recessed downward.

The discharger 14 includes a stem 19 provided upright on the mouth portion 12a of the container main body 12 to be movable downward in a state where the stem 19 is pushed upward. The stem 19 is disposed coaxially with the container axis O and is formed to have a diameter which is smaller than that of the annular concave portion 18. The stem 19 passes through the top wall 17 in the vertical direction. In the inside of the discharger 14, a discharge valve, which is not shown, is provided in a portion thereof located inside the container main body 12.

When the stem 19 is pushed down with respect to the container main body 12, the discharge valve opens, and the contents in the container main body 12 pass through the stem 19 and are discharged from an upper end portion of the stem 19. At this time, in the embodiment, for example, the foamy contents in the container main body 12 are discharged from the upper end portion of the stem 19. When the pushing down of the stem 19 is released, the stem 19 is moved upward by an upward pushing force acting on the stem 19 and the discharge valve is closed, and the discharge of the contents is stopped. The container main body 12 and the discharger 14 described above constitute a discharge container main body 20 which discharges the contents stored in the container main body 12 from the stem 19. In the shown example, an aerosol can in which liquid contents are accommodated is adopted as the discharge container main body 20.

The fixing member 13 is fixed to the mouth portion 12a of the container main body 12 to surround the stem 19 from the outside in the radial direction. The fixing member 13 is formed in a multiple cylindrical shape that is coaxial with the container axis O. The fixing member 13 is fixed to the mouth portion 12a of the container main body 12 not to be rotatable around the container axis O and not to be movable upward. The fixing member 13 includes an outer cylindrical portion 21, an inner cylindrical portion 22, and a protruding portion 23A.

In the embodiment, the outer cylindrical portion 21 is formed in a double cylindrical shape having an annular groove which is open toward the upper side, and a lower end portion of a circumferential wall portion 15a of the exterior portion 15 is fitted into the annular groove. The outer cylindrical portion 21 has a circular shape that is coaxial with the container axis O.

The inner cylindrical portion 22 is fitted into an annular concave portion 18 of the top wall 17. The inner cylindrical portion 22 is fitted into an outer circumferential surface facing toward the inside in the radial direction in the annular concave portion 18 from an inner side in the radial direction. The protruding portion 23A connects the outer cylindrical portion 21 with the inner cylindrical portion 22 and protrudes upward. In a discharge state which will be described later, an outer circumferential surface of the protruding portion 23A and an inner circumferential surface of an inner plate main body 30 are disposed at a position in which they are close to each other in the radial direction.

The exterior portion 15 has a top wall portion 24 disposed above the stem 19. The top wall portion 24 is formed in a plate shape orthogonal to the container axis O. A shape of an inner circumferential surface of the exterior portion 15 in a top view has a circular shape that is coaxial with the container axis O. The exterior portion 15 is formed in a topped cylindrical shape arranged coaxially with the container axis O. A core body 25, a molding hole (discharge hole) 26A, and an insertion bole 29 are formed in the exterior portion 15. The core body 25 extends downward from the top wall portion 24. The core body 25 is disposed coaxially with the container axis O. The core body 25 is located above an upper end edge of the stem 19. An outer diameter of the core body 25 is smaller than an inner diameter of the stem 19, and the core body 25 faces the upper end portion of the stem 19 in the vertical direction. The core body 25 is formed in a solid rod shape or column shape. A reduced diameter portion is formed at a lower end portion of the core body 25.

A plurality of molding holes 26A are formed to pass through the top wall portion 24 of the exterior portion 15 in the vertical direction. The plurality of molding holes 26A are opened separately in a discharge surface 27 facing upward in the top wall portion 24 and a supply surface 28 facing downward in the top wall portion 24. The discharge surface 27 and the supply surface 28 extend in a direction orthogonal to the container axis O.

The molding hole 26A is formed in a long hole shape which extends in the circumferential direction. The plurality of molding holes 26A are arranged at intervals in the circumferential direction and the radial direction. In the embodiment, the plurality of molding holes 26A arranged at intervals in the circumferential direction form a hole array L1, and these hole arrays L1 are disposed at multiple positions around the container axis O. The hole array L1 is disposed to surround the core body 25 from the outside in the radial direction in a top view.

The insertion hole 29 is formed by notching the circumferential wall portion 15a of the exterior portion 15 so that a lower end side of the circumferential wall portion 15a opens, and passes through the exterior portion 15 in the radial direction. The insertion hole 29 is provided at such a position and dimension that a pushing-down portion 71 of the inner plate 61 which will be described later can be inserted and protrude toward the outside of the exterior portion 15.

The inner plate 61 is provided to be movable in the vertical direction in the exterior portion 15, and rotational movement of the inner plate 61 with respect to the exterior portion 15 is restricted. The inner plate 61 includes an inner plate main body 30 disposed in the exterior portion 15, a guide cylinder 31 in which the stem 19 moves, forward and backward, a locking portion 36 which is locked to the stem 19 and moves down the stem 19 as the inner plate 61 moves down, and the pushing-down portion 71 which protrudes toward the outside in the radial direction. The inner plate main body 30 is formed in a cylindrical shape with a top and is fitted into the exterior portion 15 to be movable in the vertical direction. An outer circumferential surface of the inner plate main body 30 slides on an inner circumferential surface of the exterior portion 15 in the vertical direction. A top view shape of the inner plate main body 30 is formed to have the same shape and the same size as a top view shape of the inner circumferential surface of the exterior portion 15.

A communication hole 34 is formed in the inner plate main body 30. The communication hole 34 passes through the inner plate main body 30 in the vertical direction. The communication hole 34 is disposed coaxially with the container axis O. The communication hole 34 has a larger diameter than the core body 25, and the core body 25 is inserted into the communication bole 34. The communication hole 34 has a smaller diameter than an outer diameter of the stem 19.

The guide cylinder 31 extends downward from the inner plate main body 30, and the guide cylinder 31 is disposed coaxially with the container axis O.

The inner plate 61 moves in the vertical direction between an upper standby position in which the inner plate 61 is in contact with or close to the supply surface 28 as shown in FIG. 1 and a lower discharge position in which the inner plate 61 moves down the stein 19 to supply the contents from the stem 19 into a diffusion chamber 35 as shown in FIG. 4. As shown in FIG. 1, when the inner plate 61 is located at the standby position, the core body 25 is inserted into the communication hole 34.

As shown in FIG. 4, in the discharge position, the inner plate 61 moves downward from the supply surface 28 and forms the diffusion chamber 35 between the supply surface 28 and the inner plate 61. The diffusion chamber 35 diffuses the contents from the stem 19 in the radial direction (a direction along the discharge surface 27 and the supply surface 28) between the supply surface 28 facing downward in the top wall portion 24 and the inner plate 61 so that the contents are supplied into each of the plurality of molding holes 26A. The diffusion chamber 35 is disposed coaxially with the container axis O. The diffusion chamber 35 is formed in a flat shape that is larger in the radial direction than in the vertical direction. A part of a wall surface of the diffusion chamber 35 is formed by the supply surface 28.

The locking portion 36 that is locked to the stem 19 and moves down the stem 19 when the inner plate 61 is located at the discharge position is provided on the inner plate 61. The locking portion 36 is located at an opening circumferential edge portion of the communication hole 34 in the inner plate main body 30, comes into contact with the upper end edge of the stem 19 from above, and moves down the stem 19. At this time, the communication hole 34 communicates the inside of the stem 19 with the diffusion chamber 35. At this time, the inner plate main body 30 of the inner plate 61 is located below the core body 25, and the core body 25 is disposed inside the diffusion chamber 35.

Figure 3:
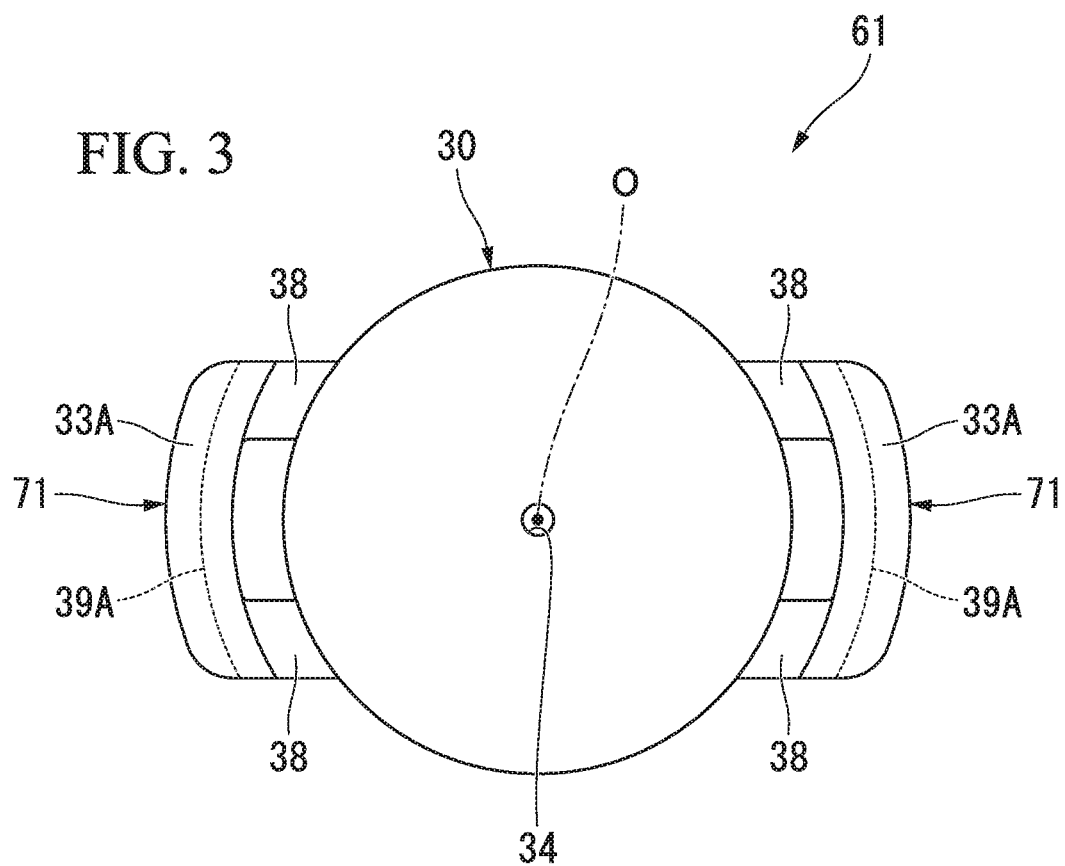
FIG. 3 is a top view showing an inner plate of the discharge container shown in FIG. 2.

As shown in FIGS. 1 and 3, the pushing-down portion 71 that protrudes toward the outside in the radial direction is provided on the inner plate 61. The pushing-down portion 71 includes a side plate 39A of which a front surface and a back surface extend along an outer circumferential surface of the exterior portion 15, a pushing-down plate 33A which protrudes toward the outside from the side plate 39A in the radial direction and of which front and back surfaces are directed upward and downward, and a coupling plate 38 which connects the side plate 39A with the inner plate main body 30 and is inserted into the insertion hole 29. Further, the pushing-down portion 71 is disposed on the outside of the exterior portion 15 in the radial direction through the insertion hole 29 formed in the circumferential wall portion 15a of the exterior portion 15.

Two pushing-down portions 71 are provided and disposed separately at positions which sandwich the container axis O in the radial direction on the outer circumferential surface of the inner plate main body 30. The coupling plate 38 protrudes toward the outside in the radial direction from a lower end portion of the outer circumferential surface of the inner plate main body 30. A plurality of (two in the shown example) coupling plates 38 are disposed at intervals in the circumferential direction. The coupling plate 38 connects the inner plate main body 30 with the side plate 39A in a state of being inserted into the insertion hole 29. The side plate 39A is disposed to extend in the vertical direction. The front surface and the back surface of the side plate 39A extend along the outer circumferential surface of the exterior portion 15. The side plate 39A connects the coupling plate 38 and the pushing-down plate 33A.

The pushing-down plate 33A protrudes toward the outside in the radial direction from an upper end portion of the side plate 39A. The front surface and the back surface of the pushing-down plate 33A are directed in the vertical direction. The front surface of the pushing-down plate 33A is formed to be flush with the discharge surface 27 of the exterior portion 15. The from surface of the pushing-down plate 33A may not be flush with the discharge surface 27.

A pushing member 50 formed of a spring member is provided between the fixing member 13 and the inner plate 61. The pushing member 50 pushes the inner plate 61 located at the discharge position upward and moves upward to the standby position. An upper end portion of the pushing member 50 is in contact with a lower surface of the inner plate main body 30, and a lower end portion of the pushing member 50 is in contact with an upper surface of a flange portion 22a which protrudes toward the inside in the radial direction from the inner cylindrical portion 22 of the fixing member 13.

Next, an operation of the discharge container 1 according to the embodiment will be described.

In an initial state before use of the discharge container 1, the inner plate 61 is disposed at the standby position as shown in FIG. 1. Then, as shown in FIG. 4, when the contents are discharged onto the discharge surface 27 of the exterior portion 15, the pushing-down plate 33A is pushed down against a pushing force of the pushing member 50, and thus an internal volume of the diffusion chamber 35 located between the top wall portion 24 of the exterior portion 15 and the inner plate 61 is increased, and the locking portion 36 of the inner plate 61 is locked to the upper end portion of the stem 19.

Further, as the inner plate 61 moves down, the stem 19 locked to the locking portion 36 moves down against the upward pushing force, and thus the contents in the container main body 12 flow into the diffusion chamber 35 through the stem 19. The contents which have flowed into the diffusion chamber 35 are diffused in the radial direction in the diffusion chamber 35 between the stem 19 and the supply surface 28 facing downward in the top wall portion 24, and then supplied to the plurality of molding holes 26A and discharged onto the discharge surface 27 from the molding holes 26A.

Here, when the contents pass through the plurality of molding holes 26A and then are molded, a plurality of shaped pieces are formed. These shaped pieces are combined on the discharge surface 27, and thus a molded object is formed. The shaped piece shaped by the molding hole 26A is formed to be long in a direction in which the molding hole 26A extends.

Then, when the pushing-down operation of the pushing-down plate 33A is released, the inner plate 61 moves upward with respect to the exterior portion 15 according to a restoring displacement of the stem 19 that is directed upward. At this time, the internal volume of the diffusion chamber 35 decreases, and the contents which have flowed into the diffusion chamber 35 are pushed out from the diffusion chamber 35 to the exterior through the molding hole 26A.

As described above, according to the discharge container 1 of the embodiment, the pushing-down portion 71 which is pushed down when the contents are discharged is provided in the inner plate 61 different from the exterior portion 15 having the discharge surface 27 onto which the contents are discharged. Therefore, it is possible to discharge the contents without touching the discharge surface 27 of the exterior portion 15 and to prevent the contents from adhering to the hands. Further, it is possible to prevent, the exterior portion 15 from wobbling and to prevent the contents from spilling out from the discharge surface 27.

Further, in the discharge container 1 of the embodiment, the pushing-down portion 71 includes the side plate 39A extending along the outer circumferential surface of the exterior portion, and the pushing-down plate 33A protruding toward the outside in the radial direction is connected to the coupling plate 38 via the side plate 39A. Therefore, it is easy to ensure bending rigidity of the pushing-down portion 71 in the vertical direction, and durability of the pushing-down portion 71 can be improved.

Further, the contents in the container body 11 is diffused in the radial direction in the diffusion chamber 35 and then supplied to the discharge holes 26A. Therefore, it is possible to minimize concentration of the contents on the discharge holes 26A disposed in a specific part of the discharge surface 27 and to supply the contents to the discharge holes 26A with less variation. Accordingly it is possible to minimize a variation in the discharge amount of the contents discharged onto the discharge surface 27 at each position.

Furthermore, in the embodiment, when the pushing-down plate 33A is pushed downward in the state in which the inner plate 61 is located at the standby position, the inner plate 61 is moved down against the upward pushing force of the pushing member 50, the internal volume of the diffusion chamber 35 formed between the supply surface 28 of the exterior portion 15 and the inner plate 61 is increased, and the locking portion 36 of the inner plate 61 is locked to the stem 19. When the inner plate 61 is further moved downward by the pushing-down operation, as the inner plate 61 moves down, the locking portion 36 moves down the stem 1 against the upward pushing force, and the inner plate 61 is disposed at the discharge position, and the contents in the container main body 12 flow into the diffusion chamber 35 through the stem 19.

After that, when the pushing-down operation of the pushing-down plate 33A is released, the upward pushing, force of the inner plate 61 by the pushing member 50 and the upward pushing force of the stem 19 cause the inner plate 61 and the stem 19 to be moved upward and thus the inner plate 61 and the stem 19 are displaced and restored, and the inner plate 61 is returned to the standby position. At this time, since the inner plate 61 is in contact with or close to the top wall portion 24 of the exterior portion 15, even if the contents remain in the diffusion chamber 35 before the inner plate 61 is moved upward, the contents are pushed out from the diffusion chamber 35 onto the discharge surface 27. That is, the inner plate 61 is restored and displaced to its initial position by releasing the pushing-down operation of the pushing-down plate 33A. Accordingly, since the contents remaining in the diffusion chamber 35 can be pushed out from the diffusion chamber 35, a remaining amount of the contents in the exterior portion 15 can be reduced. In this way, for example, it is possible to make it easy to keep the inside of the exterior portion 15 clean by reducing the remaining amount of the contents in the exterior portion 15.

The technical scope of the present invention is not limited to the above-described embodiment, and various modifications can be made without departing from the spirit of the present invention.

For example, in the above-described embodiment, a constitution is shown that two pushing-down portions 71 are provided on the inner plate main body 30, and two coupling plates 38 are disposed on one pushing-down plate 33A, but the present invention is limited to the constitution. For example, one pushing-down portion, three pushing-down portions, or more pushing-down portions may be disposed on the inner plate main body, and one coupling plate, three coupling plates, or more coupling plates may be disposed on one pushing-down plate. Further, in the above-described embodiment, a constitution that the diffusion chamber 35 is formed when the inner plate 61 is located at the discharge position, but the present invention is limited to the constitution. For example, regardless of whether the inner plate 61 is located at the standby position or at the discharge position, the diffusion chamber may be always formed, or the diffusion chamber may not be provided. Further, as a discharge valve of the discharger 14, a quantitative valve through which a certain amount of contents is discharged by a single pushing-down operation of the stem 19 may be employed. In this case, it is possible to accurately form a molded object formed by combining the contents on the discharge surface 27 via the plurality of molding holes 26A when the contents are discharged onto the discharge surface 27.

Second Embodiment

Next, a discharge container according to a second embodiment of the present invention will be described with reference to FIGS. 5 to 7. In the second embodiment, the same components as those in the first embodiment are designated by the same reference numerals, the explanation thereof will be omitted, and only different points will be described.

Figure 5:
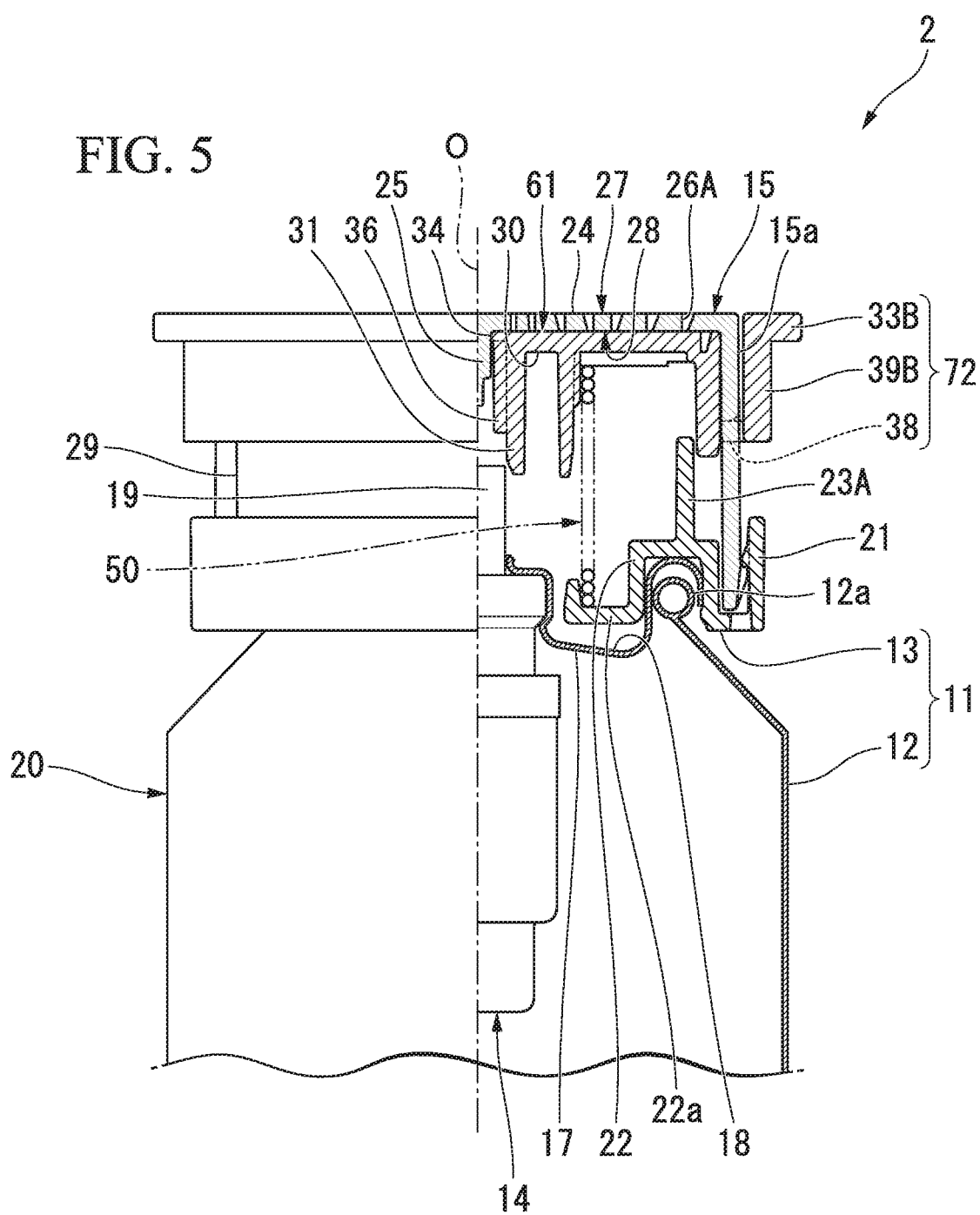
FIG. 5 is a longitudinal half sectional view of a main part of a discharge container according to a second embodiment of the present invention and is a view showing a state in which an inner plate is located at a standby position.
Figure 6:
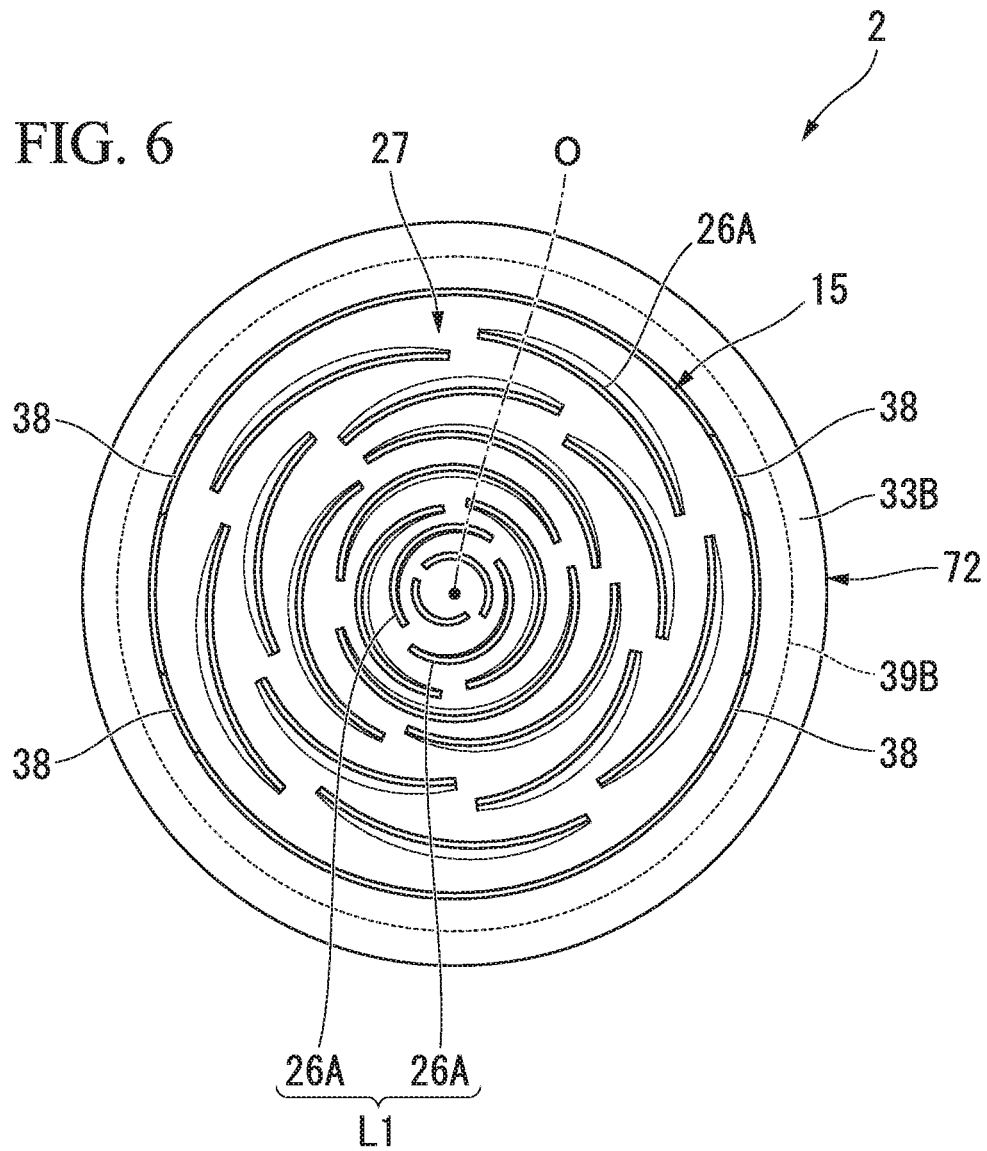
FIG. 6 is a top view of the discharge container shown in FIG. 5.
Figure 7:
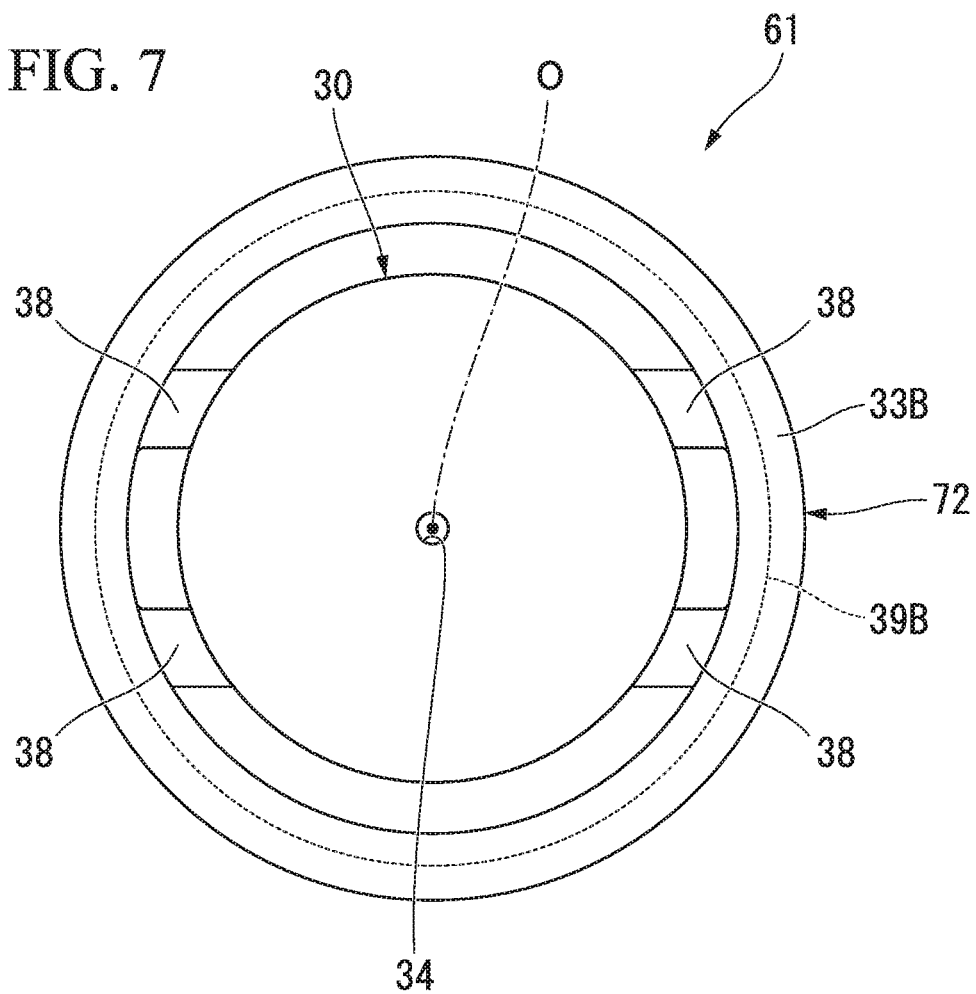
FIG. 7 is a top view showing the inner plate of the discharge container shown in FIG. 6.

As shown in FIGS. 5 to 7, in a discharge container 2 according to the embodiment, a side plate 39B and a pushing-down plate 33B of the pushing-down portion 72 are disposed over the entire circumference of the circumferential wall portion 15a of the exterior portion 15. According to the discharge container 2 of the embodiment, it is unnecessary to change the circumferential direction of the discharge container 2 when the contents are discharged, and excellent operability can be provided.

Third Embodiment

Next, a discharge container according to a third embodiment of the present invention will be described with reference to FIG. 8. In the third embodiment, the same components as those in the second embodiment are designated by the same reference numerals, the explanation thereof will be omitted, and only different points will be described.

Figure 8:
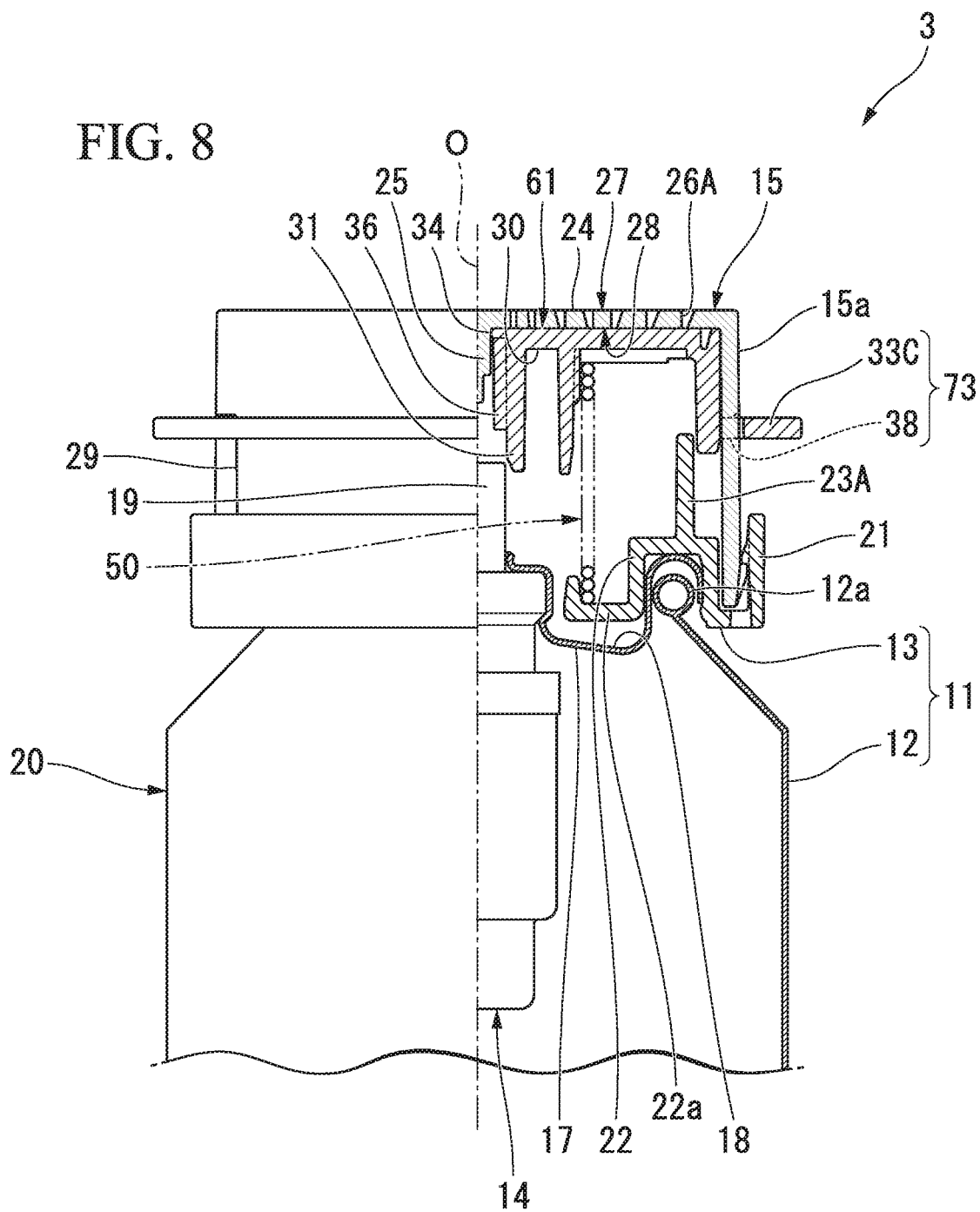
FIG. 8 is a longitudinal half sectional view of a main part oft discharge container according to a third embodiment of the present invention and is a view showing a state in which an inner plate is located at a standby position.

As shown in FIG. 8, in a discharge container 3 according to the embodiment, a pushing-down portion 73 does not have a side plate, and a pushing-down plate 33C is directly connected to an outer end of the coupling plate 38 in the radial direction. According to the discharge container 3 of the embodiment, since the pushing-down portion 73 does not have the side plate, a force applied to the pushing-down plate 33C when the pushing-down plate 33C is pushed down can be directly transmitted to the coupling plate 38, and an amount of resin forming the inner plate 61 can be reduced.

Fourth Embodiment

Next, a discharge container according to a fourth embodiment of the present invention will be described with reference to FIGS. 9 to 11. In the fourth embodiment, the same components as those in the second embodiment are designated by the same reference numerals, the explanation thereof will be omitted, and only different points will be described.

Figure 9:
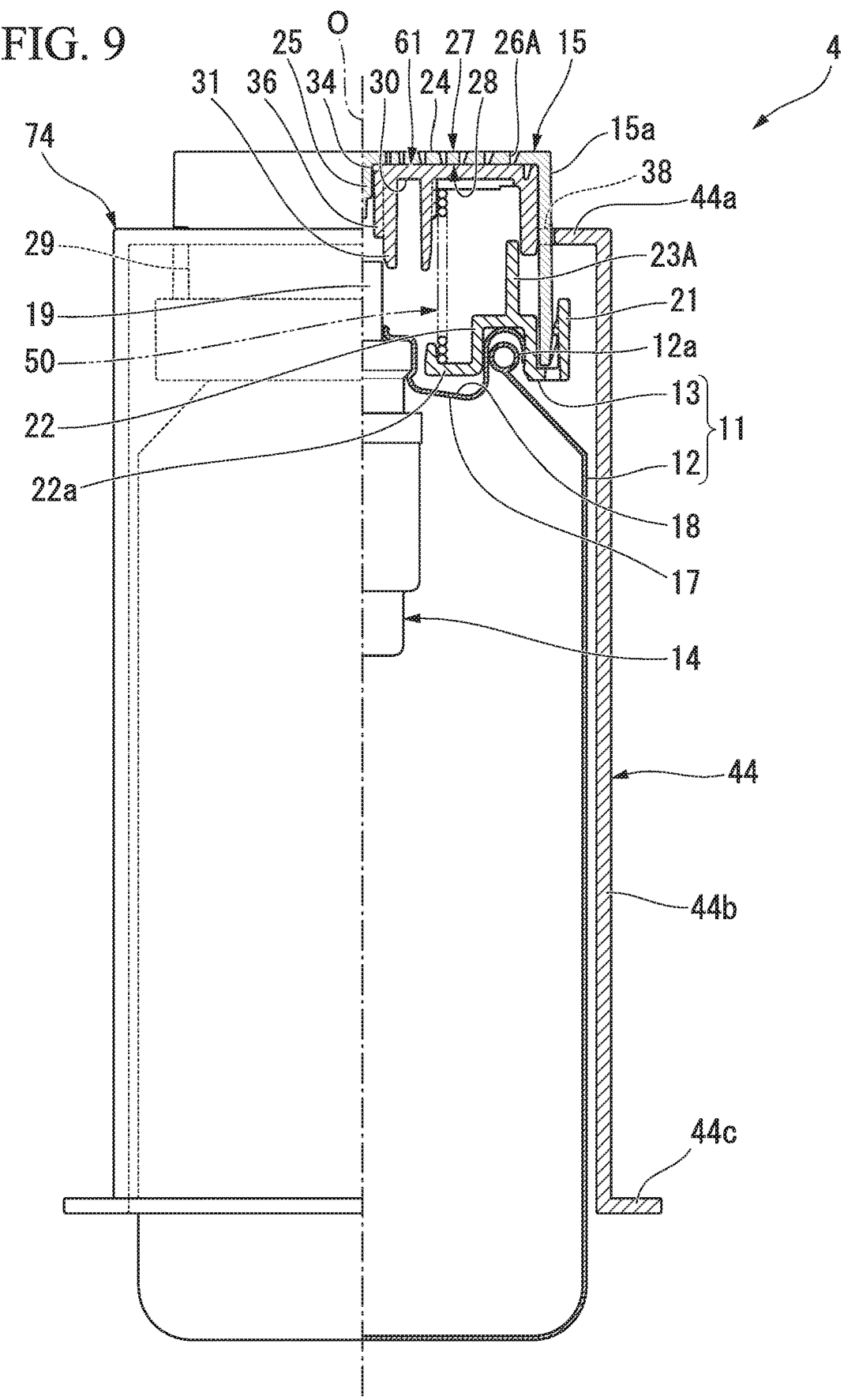
FIG. 9 is a longitudinal half sectional view of a main part of a discharge container according to a fourth embodiment of the present invention and is a view showing a state in which an inner plate is located at a standby position.
Figure 10:
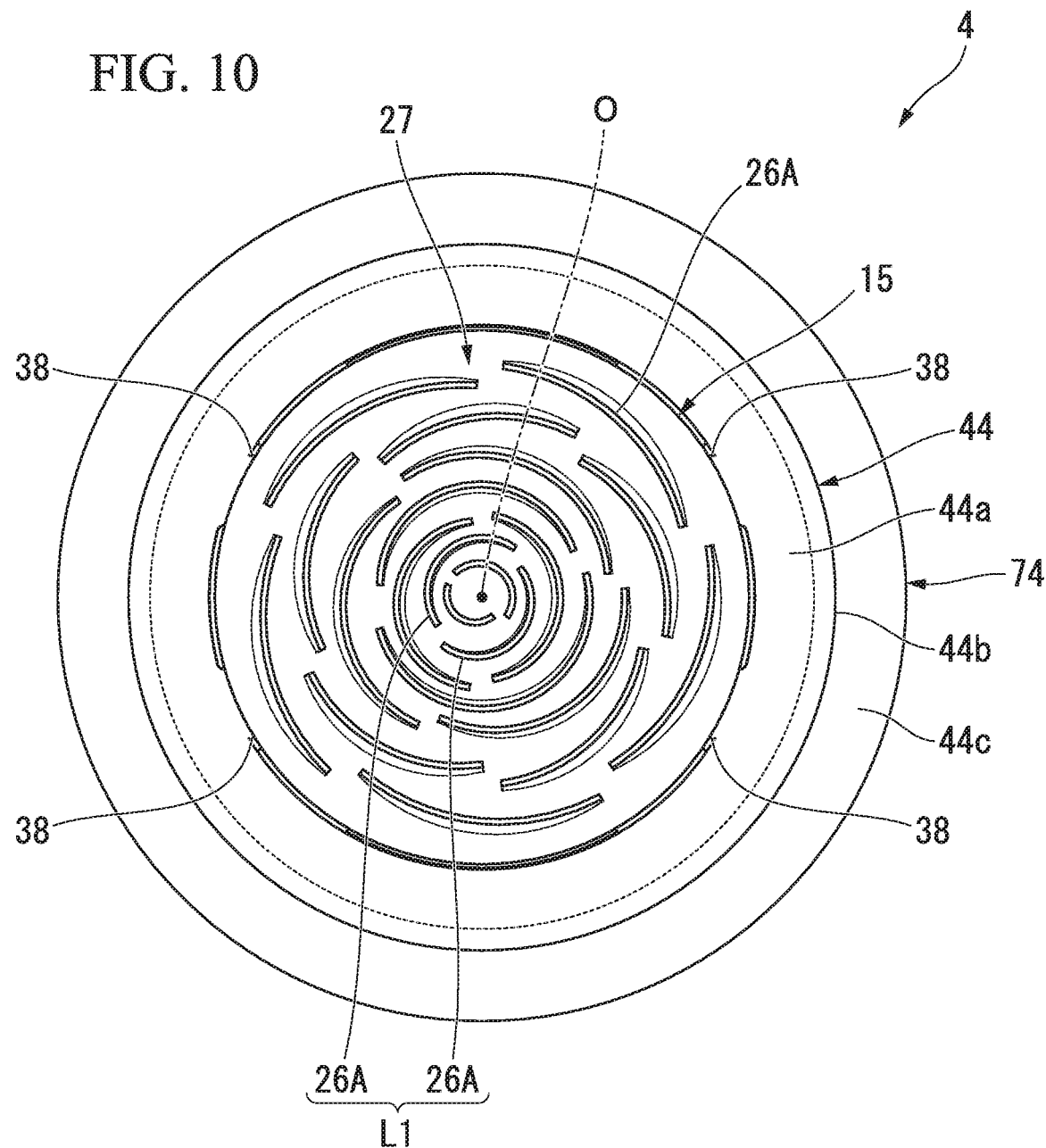
FIG. 10 is a top view of the discharge container shown in FIG. 9.
Figure 11:
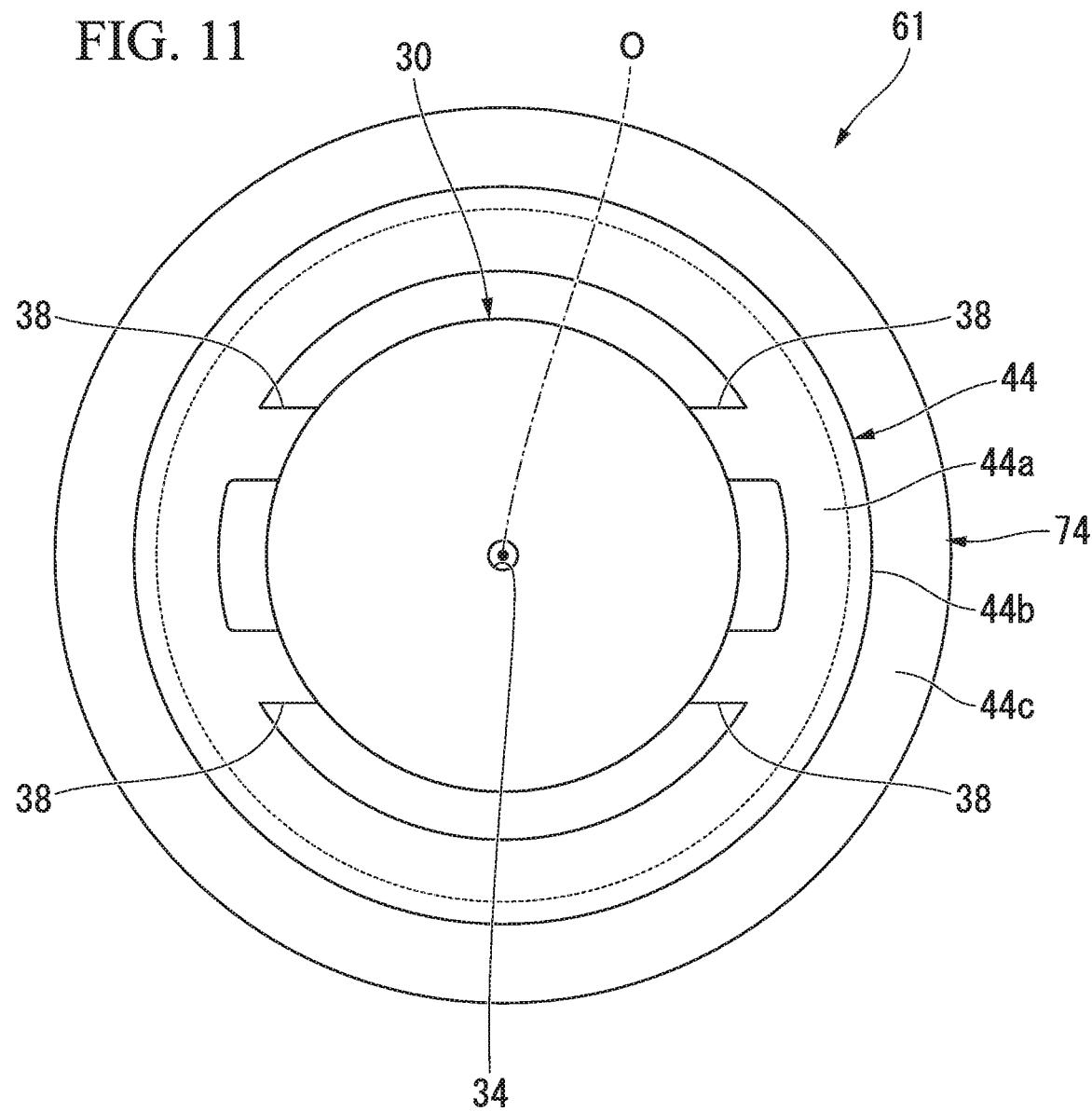
FIG. 11 is a top view showing the inner plate of the discharge container shown in FIG. 10.

As shown in FIGS. 9 to 11, a pushing-down portion 74 of a discharge container 4 according to the embodiment has a gripping cylindrical portion 44 connected to an outer end of the coupling plate 38 in the radial direction. The gripping cylindrical portion 44 is disposed coaxially with the container axis O. The gripping cylindrical portion 44 includes an annular upper flange portion 44a protruding toward the outside in the radial direction from the outer end of the coupling plate 38 in the radial direction, a main body cylinder 44b extending downward from an outer end of the upper flange portion 44a, and an annular lower flange portion 44c protruding toward the outside in the radial direction from a lower end of the main body cylinder 44b. The main body cylinder 44b covers the entire area of the container body 11 except a lower portion of the container main body 12 from the outside in the radial direction. According to the discharge container 4 of the embodiment, when the contents are discharged, for example, the contents can be discharged by an operation of griping and moving down the main body cylinder 44b in a state in which the discharge container 4 is standing, in addition to an operation of pushing down the upper flange portion 44a or the lower flange portion 44c.

Fifth Embodiment

Next, a discharge container according to a fifth embodiment of the present invention will be described with reference to FIGS. 12 to 14. In the fifth embodiment, the same components as those in the first embodiment are designated by the same reference numerals, the explanation thereof will be omitted, and only different points will be described.

Figure 12:
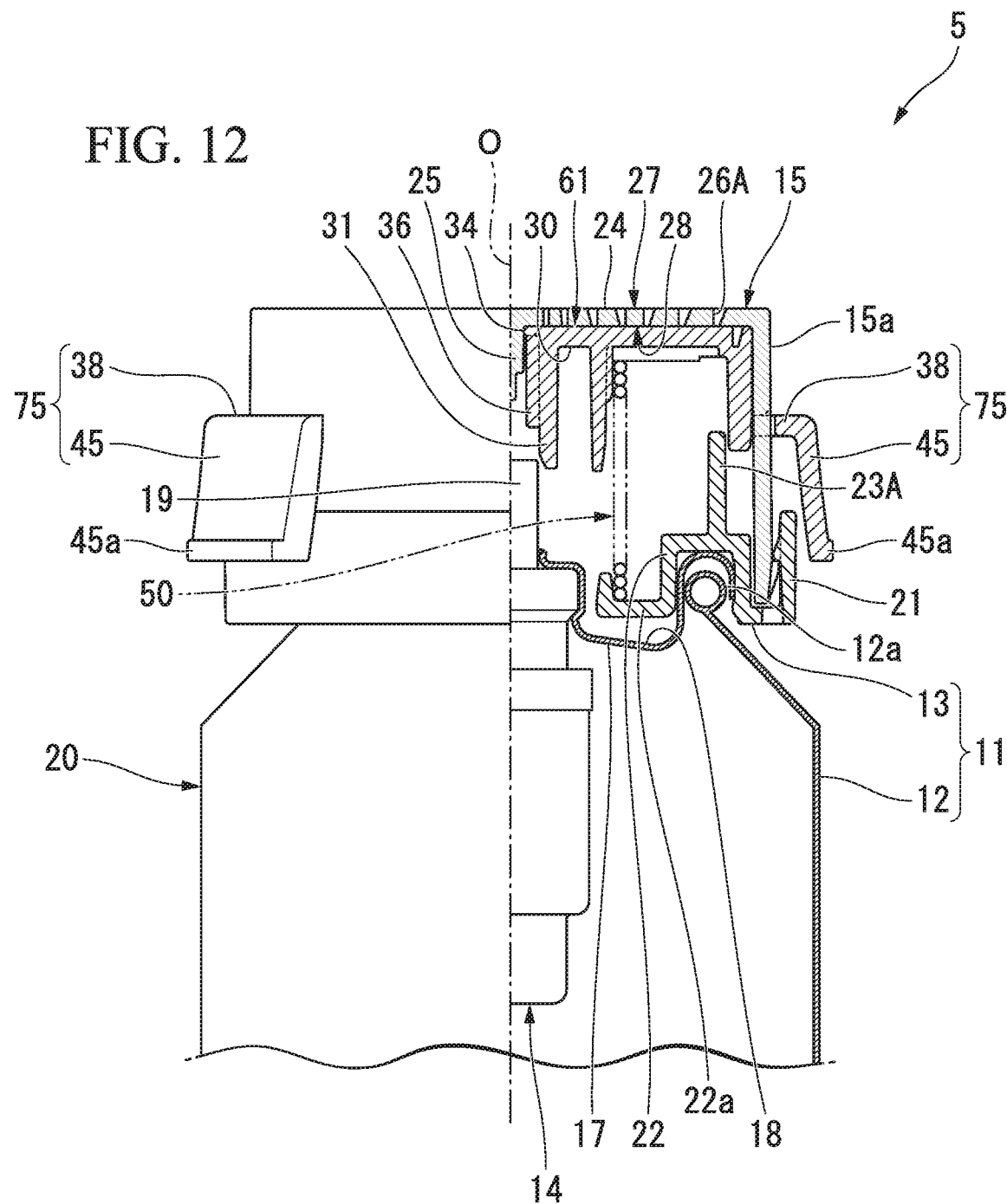
FIG. 12 is a longitudinal half sectional view of a main part of a discharge container according to a fifth embodiment of the present invention and is a view showing a state in which an inner plate is located at a standby position.
Figure 13:
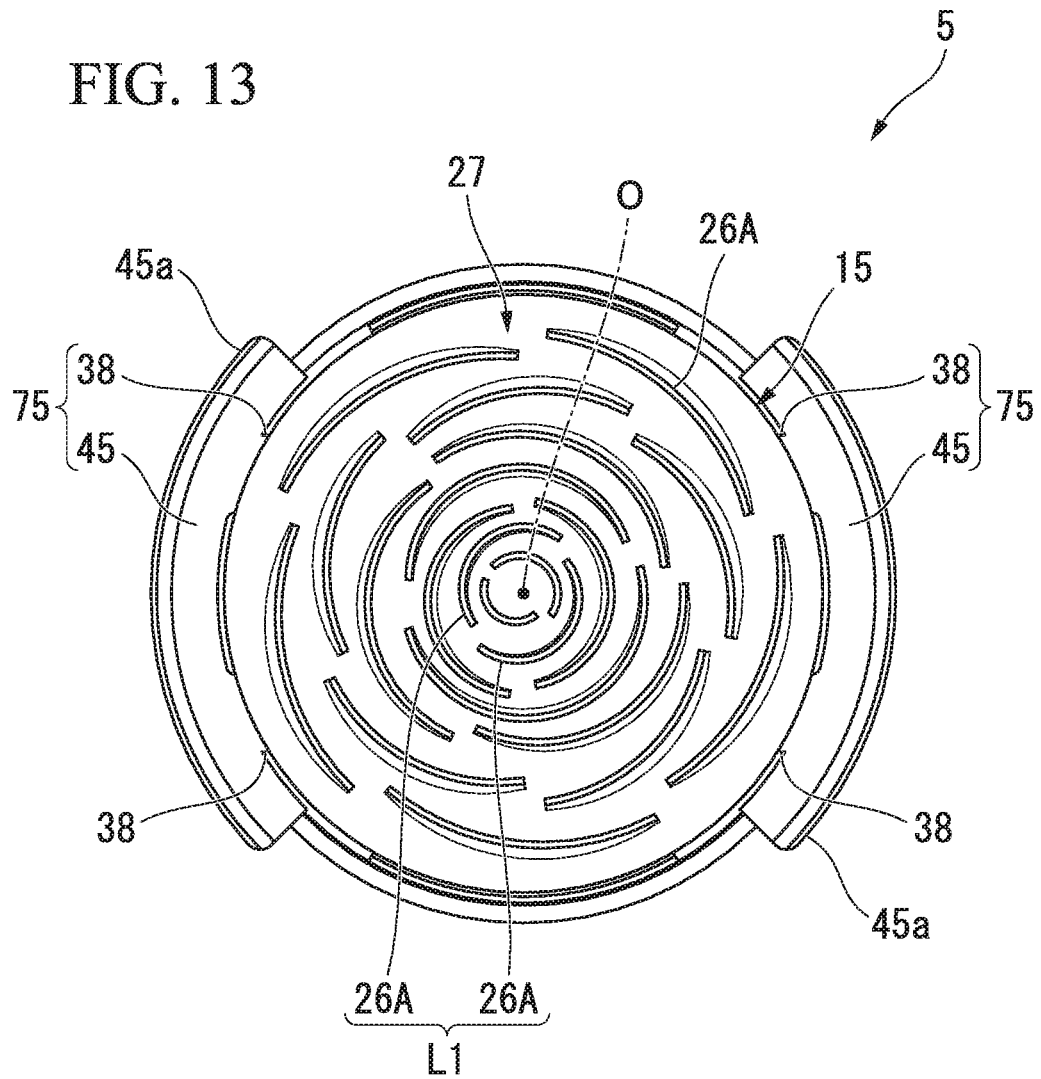
FIG. 13 is a top view of the discharge container shown in FIG. 12.
Figure 14:
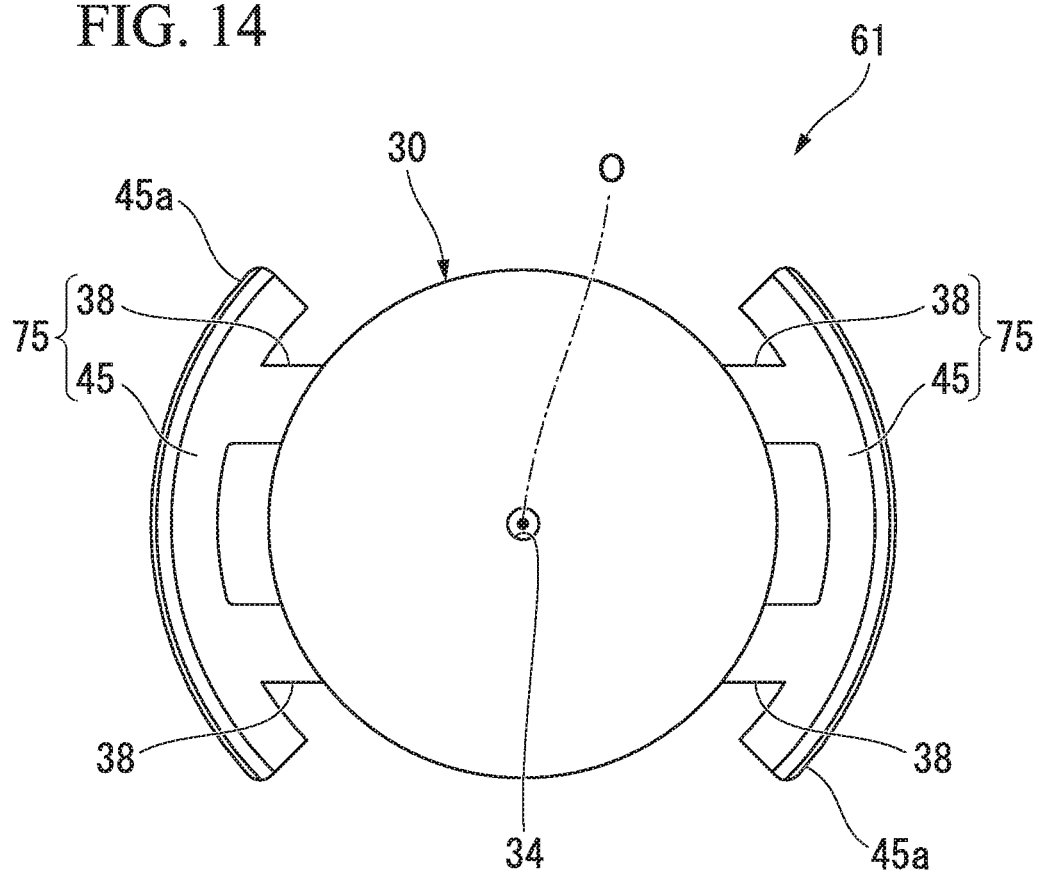
FIG. 14 is a top view showing the inner plate of the discharge container shown in FIG. 13.

As shown in FIGS. 12 to 14, a pushing-down portion 75 of a discharge container 5 according to the embodiment includes an inclined plate 45 connected to the outer end of the coupling plate 38 in the radial direction. The inclined plate 45 gradually extends toward the outside in the radial direction as it goes downward. The inclined plate 45 has a quadrangular shape when viewed from the outside in the radial direction, two sides of the quadrangular shape extend in the circumferential direction, and the other two sides of the quadrangular shape extend in the vertical direction. A protrusion portion 45a protruding toward the outside in the radial direction is formed at a lower end of the inclined plate 45. According to the discharge container 5 of the embodiment, when the contents are discharged, it is possible to push down the entire pushing-down portion 75 while clamping a pair of inclined plates 45 separately disposed at positions in which the container axis O is interposed between the positions in the radial direction. Therefore, it is possible to stabilize a posture of the discharge container 5 at the time of discharging the contents.

Sixth Embodiment

Next, a discharge container according to a sixth embodiment of the present invention will be described with reference to FIGS. 15 to 17. In the sixth embodiment, the same components as those in the fifth embodiment are designated by the same reference numerals, the explanation thereof will be omitted, and only different points will be described.

Figure 15:
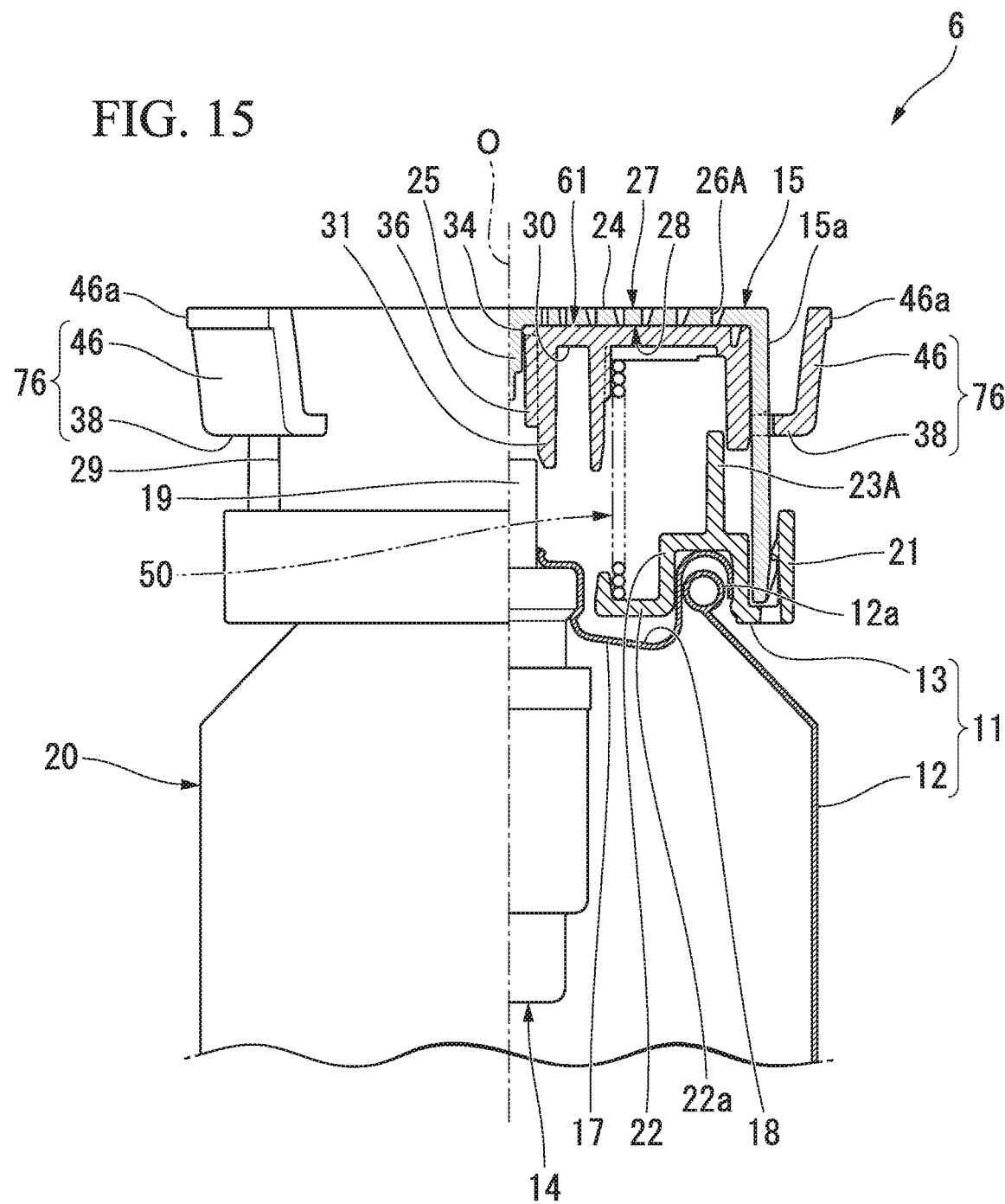
FIG. 15 is a longitudinal half sectional view of a main part of a discharge container according to a sixth embodiment of the present invention and is a view showing a state in which an inner plate is located at a standby position.
Figure 16:
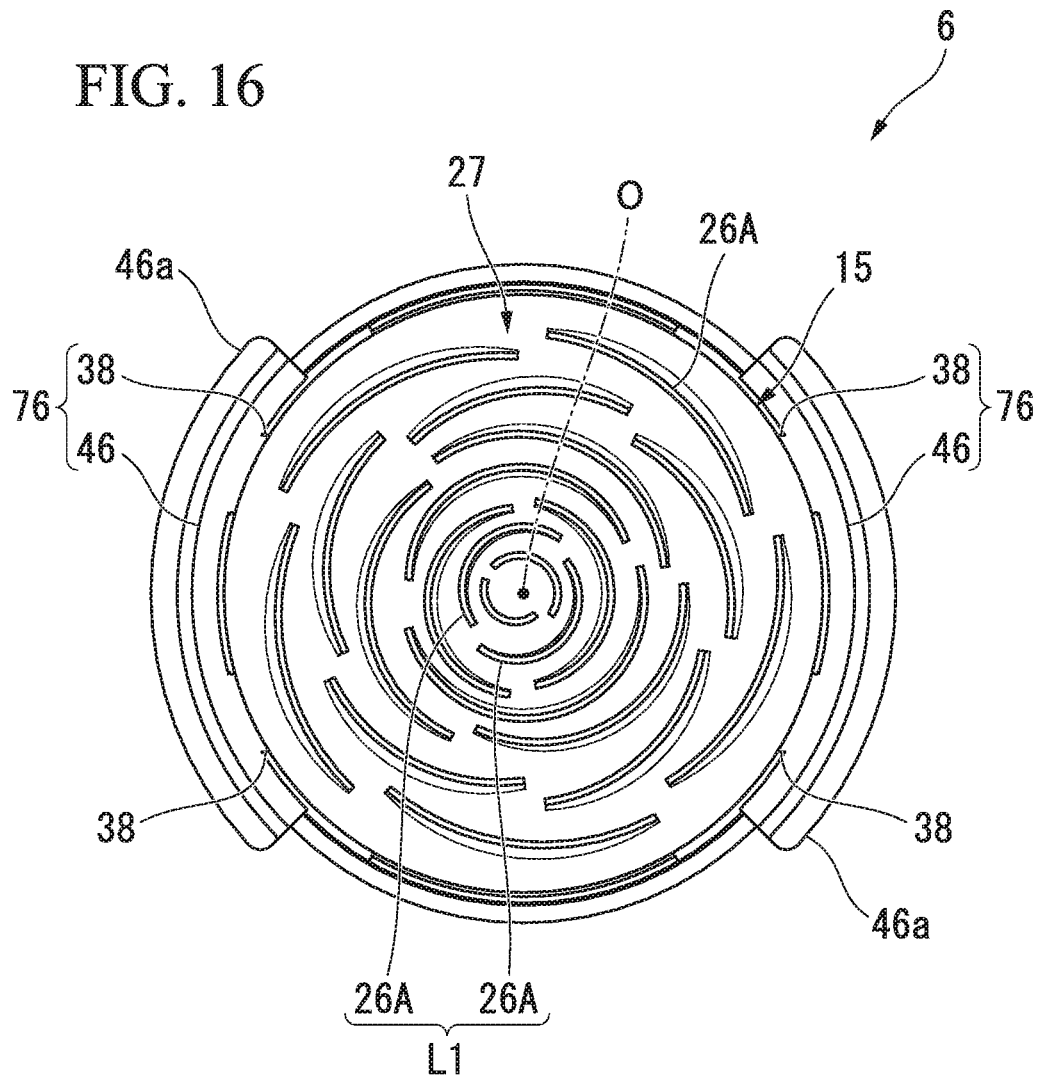
FIG. 16 is a top view of the discharge container shown in FIG. 15.
Figure 17:
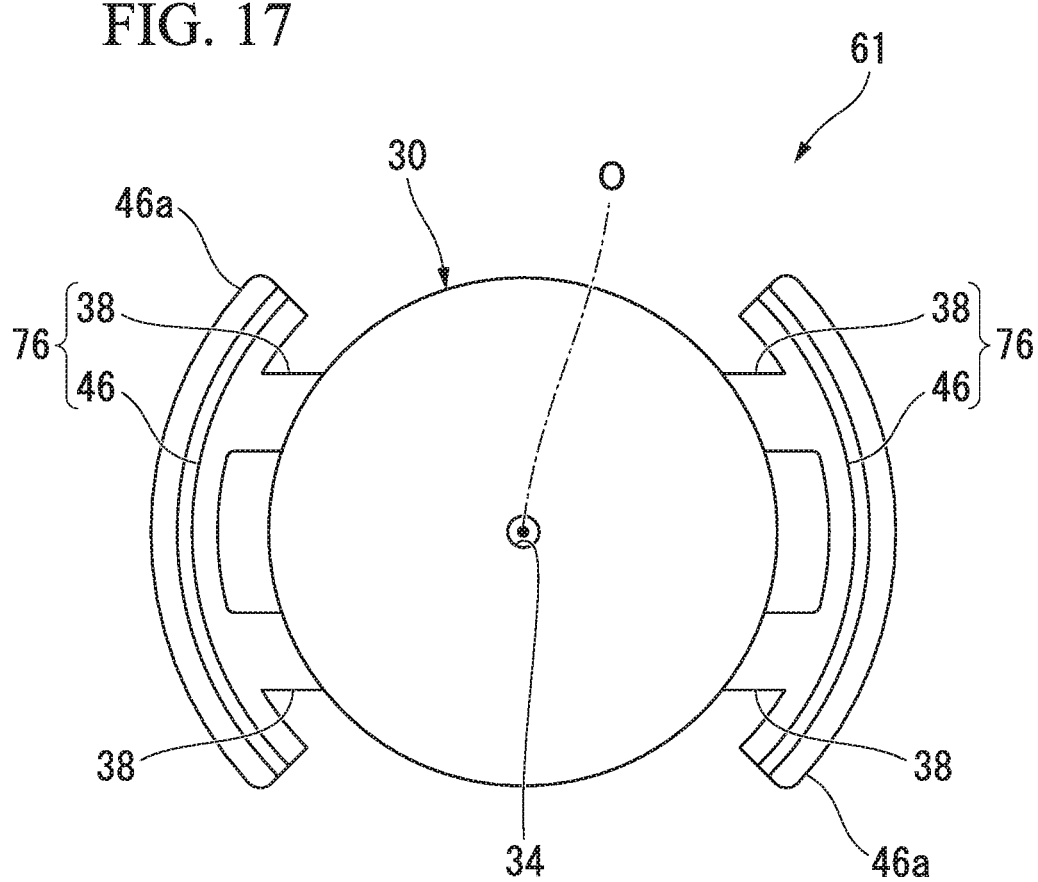
FIG. 17 is a top view showing the inner plate of the discharge container shown in FIG. 16.

As shown in FIGS. 15 to 17, a pushing-down portion 76 of a discharge container 6 according to the embodiment includes an inclined plate 46 connected to the outer end of the coupling plate 38 in the radial direction. The inclined plate 46 gradually extends toward the outside in the radial direction as it goes upward. The inclined plate 46 has a quadrangular shape when seen from the outside in the radial direction, two sides of the quadrangular shape extend in the circumferential direction, and the remaining two sides of the quadrangular shape extend in the vertical direction. A protrusion portion 46a protruding toward the outside in the radial direction is formed at an upper end of the inclined plate 46.

Seventh Embodiment

Next, a discharge container according to a seventh embodiment of the present invention will be described with reference to FIGS. 18 to 23. As shown in FIGS. 18 to 23, a discharge container 10 includes a container body 11, a discharger 14, an exterior portion 15, and an inner plate 67. The discharge container 10 discharges contents that can hold its shape for at least a certain time after discharge such as a foam material and a highly viscous material. The container body 11 includes a container main body 12 in which the contents are stored, and a fixing member 13 attached to a mouth portion 12a of the container main body 12. A cap C which covers an exterior portion 15 from the outside, has a cylindrical shape with a top, and is removably attached to the container main body 12 is provided at the container main body 12.

Here, in the embodiment, the container main body 12 is formed in a cylindrical shape with a bottom, and the exterior portion 15 is finned in a cylindrical shape with a top, and center axes thereof are disposed on a common axis. Hereinafter, the common axis is referred to as a container axis O, a side of the bottom of the container body main 12 in a direction along the container axis O is referred to as a lower side, a side of the mouth portion 12a of the container main body 12 in a direction along the container axis O is referred to as an upper side, and the direction along the container axis O is referred to as a vertical direction. In a top view of the discharge container 10, a direction orthogonal to the container axis O is referred to as a radial direction, and a direction of circling around the container axis O is referred to as a circumferential direction.

The container main body 12 is hermetically sealed by covering the mouth portion 12a of the container main body 12 with a top wan 17. An annular concave portion 18 extending in the circumferential direction is provided in the top wall 17. The annular concave portion 18 is recessed downward.

The discharger 14 includes a stem 19 provided upright on the mouth portion 12a of the container main body 12 to be movable downward in a state where the stem 19 is pushed upward. The stem 19 is disposed coaxially with the container axis O and is formed to have a diameter that is smaller than that of the annular concave portion 18. The stem 19 passes through the top wall 17 in the vertical direction. In the inside of the discharger 14, a discharge valve, which is not shown, is provided in a portion thereof located inside the container main body 12.

When the stem 19 is pushed down with respect to the container main body 12, the discharge valve opens, and the contents in the container main body 12 pass through the stem 19 and are discharged from an upper end portion of the stem 19. At this time, in the embodiment, for example, the foamy contents in the container main body 12 are discharged from the upper end portion of the stem 19. When the pushing down of the stem 19 is released, the stem 19 moves upward due to an upward pushing force acting on the stem 19, the discharge valve is closed, and the discharge of the contents is stopped. The container main body 12 and the discharger 14 described above constitute a discharge container main body 20 which discharges the contents stored in the container main body 12 from the stem 19. In the shown example, an aerosol can in which liquid contents are accommodated is adopted as the discharge container main body 20.

The fixing member 13 is fixed to the mouth portion 12a of the container main body 12 to surround the stem 19 from the outside in the radial direction. The fixing member 13 is formed in a multiple cylindrical shape that is coaxial with the container axis O. The fixing member 13 is fixed to the mouth portion 12a of the container main body 12 not to be rotatable around the container axis O and not to be movable upward. The fixing member 13 includes an outer cylindrical portion 21, an inner cylindrical portion 22, and a coupling portion 23B.

In the embodiment, the outer cylindrical portion 21 is formed in a double cylindrical shape having an annular groove that is open toward the upper side, and a lower end portion of a circumferential wall portion 15a of the exterior portion 15 is fitted into the annular groove. In the shown example, the exterior portion 15 is disposed to be rotatable around the container axis O with respect to the fixing member 13 by fitting the circumferential wall portion 15a of the exterior portion 15 into the inside of the outer cylindrical portion 21, and the upward movement of the exterior portion 15 with respect to the fixing member 13 is restricted. A top view shape of the outer cylindrical portion 21 when seen in the vertical direction is formed in a circular shape that is coaxial with the container axis O.

The inner cylindrical portion 22 is fitted into an annular concave portion 18 of the top wall 17. The inner cylindrical portion 22 is fitted into an outer circumferential surface of the annular concave portion 18 that faces the inside in the radial direction from an inner side in the radial direction. An upper end portion of the inner cylindrical portion 22 is located above an upper end portion of the outer cylindrical portion 21. The coupling portion 23B is disposed above the mouth portion 12a of the container body 12. The coupling portion 23B connects an intermediate portion of the inner cylindrical portion 22 in the vertical direction with the upper end portion of the outer cylindrical portion 21.

The exterior portion 15 has a top wall portion 24 disposed above the stem 19. The top wall portion 24 is formed in a plate shape orthogonal to the container axis O. A top view shape of an inner circumferential surface of the exterior portion 15 has a circular shape that is coaxial with the container axis O.

A core body 25, a discharge hole 26B, and an insertion hole 29 are provided in the exterior portion 15. The core body 25 extends downward from the top wall portion 24. The core body 25 extends in the vertical direction and is disposed coaxially with the container axis O. The core body 25 is located above the upper end edge of the stem 19. An outer diameter of the core body 25 is smaller than an inner diameter of the stem 19, and the core body 25 faces the upper end portion of the stem 19 in the vertical direction. The core body 25 is formed in a solid bar shape or column shape. The core body 25 is formed to have the same diameter over the entire length in the vertical direction.

A plurality of discharge holes 26B are formed to pass through the top wall portion 24 of the exterior portion 15 in the vertical direction. The plurality of discharge holes 26B are opened in each of the discharge surface 27 which faces upward in the top wall portion 24 and the supply surface 28 which faces downward in the top wall portion 24. The discharge surface 27 and the supply surface 28 extend in a direction orthogonal to the container axis O.

The discharge hole 26B is formed in a circular shape in a top view. The plurality of discharge holes 26B are arranged at intervals to form a radial shape around the container axis O in the top wall portion 24. In the embodiment, the plurality of discharge holes 26B arranged on the top wall portion 24 at intervals in the circumferential direction form hole arrays L2 (refer to FIG. 19), and the hole arrays L2 are arranged at multiple positions around the container axis O. The hole array L2 is disposed to surround the core body 25 from the outside in the radial direction in a top view of the top wall portion 24 when seen in the vertical direction.

Figure 18:
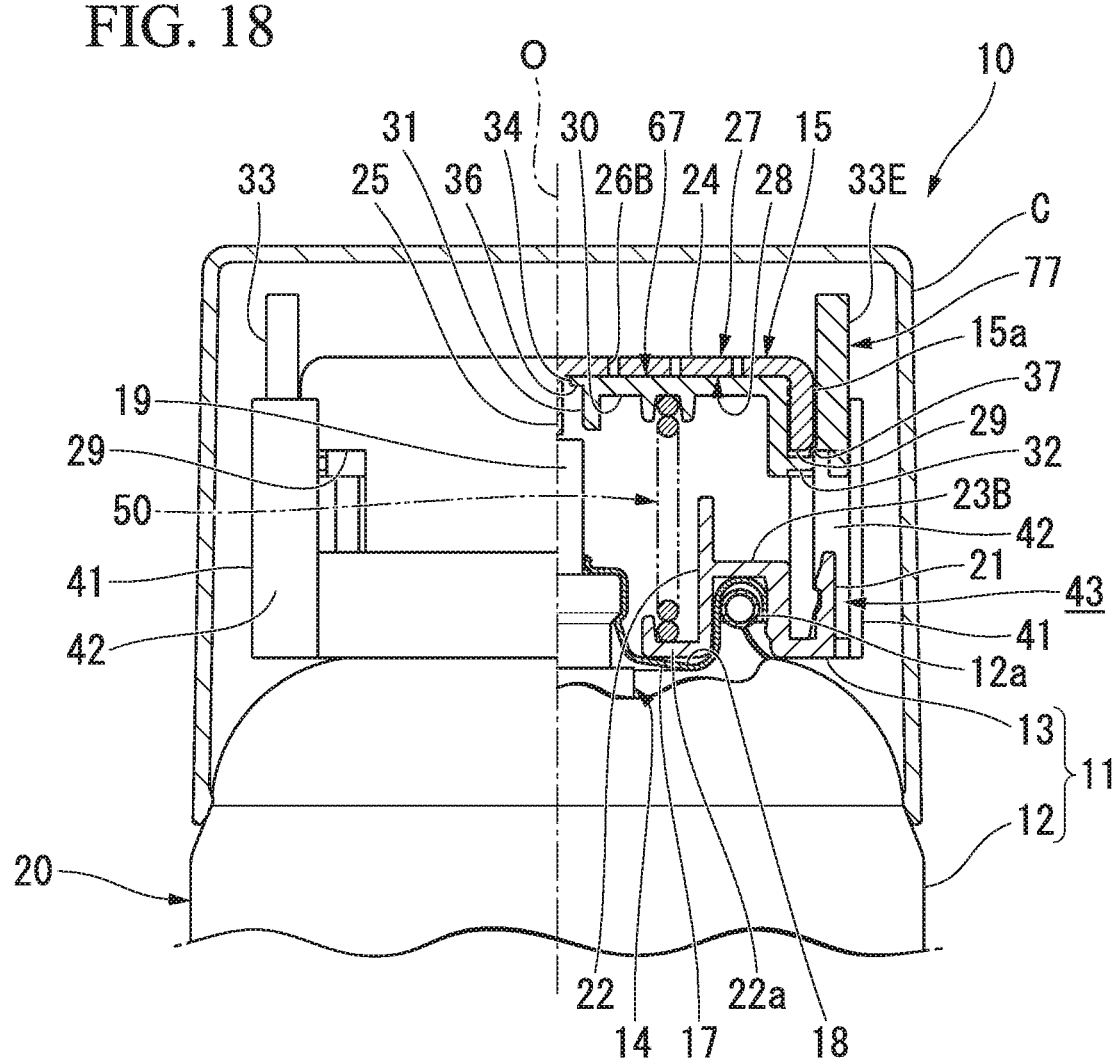
FIG. 18 is a longitudinal half sectional view of a main part of a discharge container according to an embodiment of the present invention and is a view showing a state in which an inner plate is located at a standby position.
Figure 19:
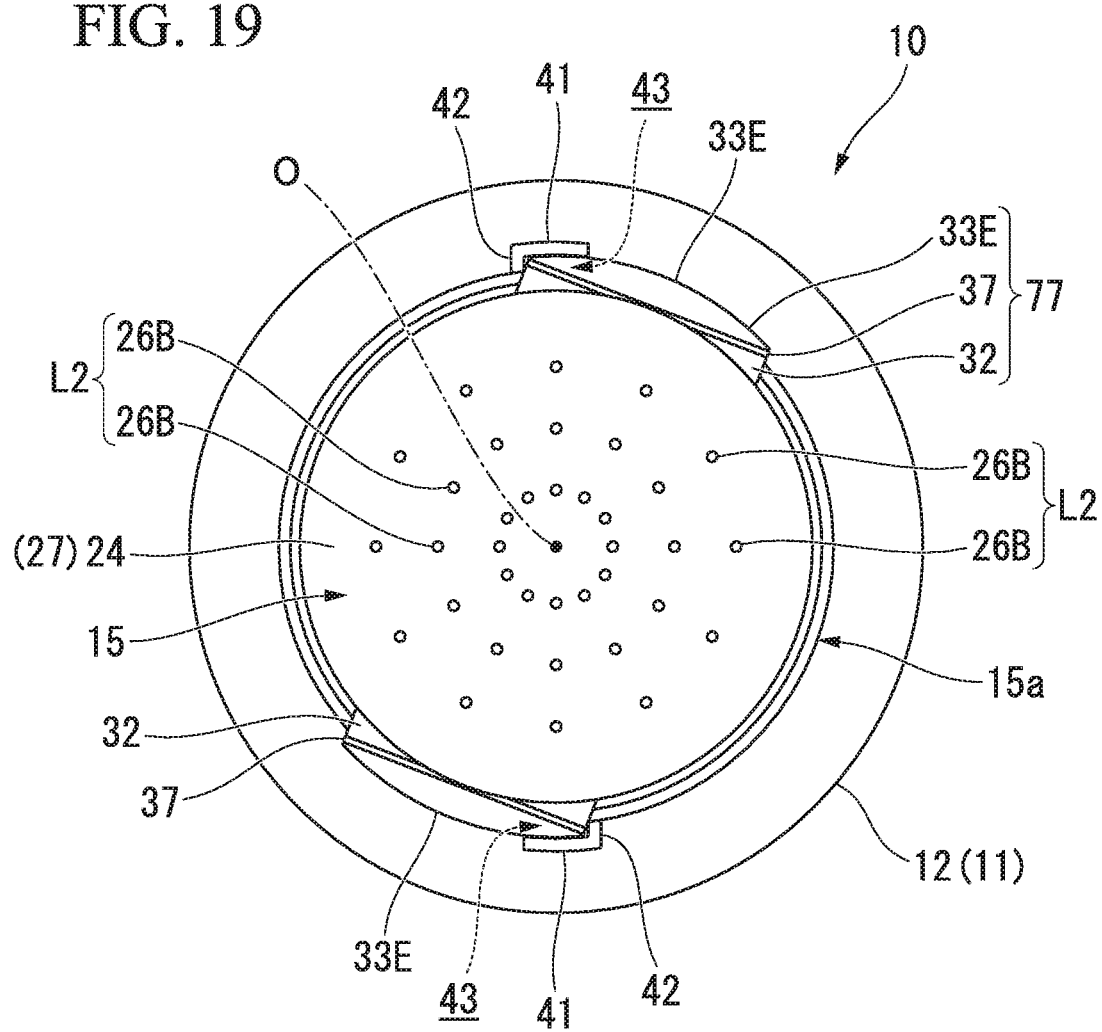
FIG. 19 is a top view of the discharge container shown in FIG. 18 and is a view of the exterior portion as seen from an upper side.

Here, as shown in FIGS. 18 and 19, a restricting wall 41 is disposed at the fixing member 13 of the container body 11 in a state in which a gap 43 is provided between the fixing member 13 and the circumferential wall portion 15a of the exterior portion 15. A positioning wall 42 protruding toward the inside in the radial direction and connected to the fixing member 13 is formed at an end portion of the restricting wall 41 on one side in the circumferential direction. In the shown example, the restricting wall 41 and the positioning wall 42 extend from the lower end of the fixing member 13 to a position above the insertion hole 29 in the vertical direction. A lower end of the restricting wall 41 is connected to a lower end portion of an outer cylinder portion of the outer cylindrical portion 21 formed in a double cylinder shape. A lower end of the positioning wall 42 is connected to the outer cylindrical portion 21. The gap 43 is formed to have a size such that at least a part of a pushing-down plate 33E of the inner plate 67, which will be described later, can enter.

The insertion hole 29 is formed by notching the circumferential wall portion 15a of the exterior portion 15 so that a lower end side of the circumferential wall portion 15a opens, and passes through the exterior portion 1 in the radial direction. The insertion hole 29 is provided in such a position and dimension that a part (a locking protrusion portion 32 which will be described later and a pushing-down plate 33E) of the inner plate 67 which will be described below can be inserted to protrude toward the outside of the exterior portion 15. The cutout dimension of the insertion hole 29 in the vertical direction is set to such a size that at least the inner plate 67 can move upward and downward between a standby position and a discharge position which will be described later at a position in which the pushing-down plate 33E deviates from the gap 43.

The inner plate 67 is provided to be movable in the vertical direction in the exterior portion 15, and rotational movement of the inner plate 67 with respect to the exterior portion 15 is restricted. The inner plate 67 includes an inner plate main body 30, a guide cylinder 31, a locking portion 36, and a pushing-down portion 77. The inner plate main body 30 is formed in a cylindrical shape with a top and fitted into the exterior portion 15, and an outer circumferential edge of the inner plate main body 30 slides on the inner circumferential surface of the exterior portion 1 in the vertical direction. The inner plate main body 30 is fitted to an upper portion of the inner circumferential surface of the exterior portion 15. A top view shape of the inner plate main body 30 is formed to have the same shape and the same size as a top view shape of the upper portion of the inner circumferential surface of the exterior portion 15.

A communication hole 34 is formed in the inner plate main body 30. The communication hole 34 passes through the inner plate main body 30 in the vertical direction. The communication hole 34 is disposed coaxially with the container axis O. The communication hole 34 has a larger diameter than the core body 25, and the core body 25 is inserted into the communication hole 34. The communication hole 34 has a smaller diameter than an outer diameter of the stem 19.

The guide cylinder 31 extends downward from the inner plate main body 30, and the stem 19 moves forward and backward inside the guide cylinder 31. The guide cylinder 31 is disposed coaxially with the container axis O. The guide cylinder 31 is externally fitted onto the stem 19 to be relatively rotatable about the container axis O.

Figure 21:
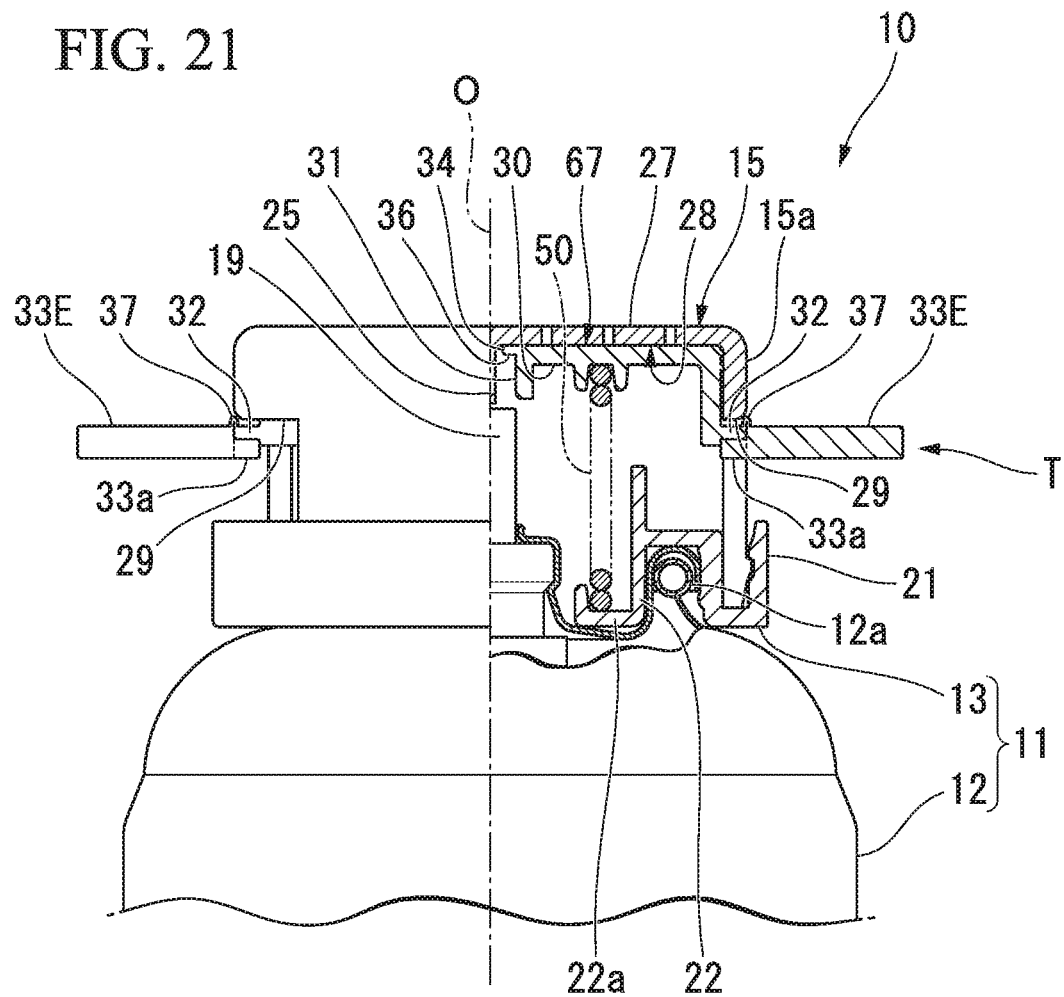
FIG. 21 is a longitudinal half sectional view of a main part of the discharge container shown in FIG. 18 and a view showing a state in which a pushing-down plate is in a use posture.
Figure 22:
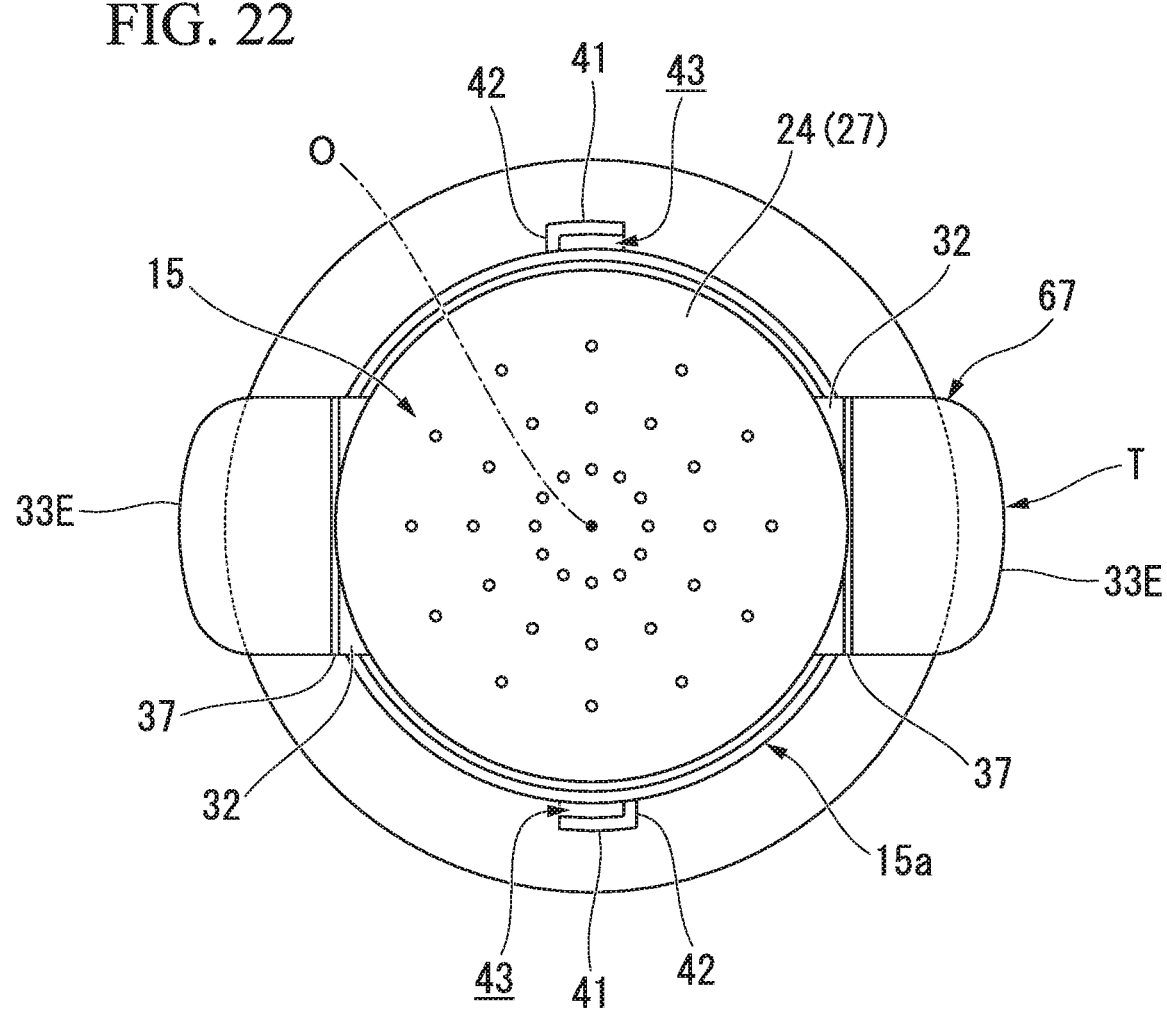
FIG. 22 is a top view of the discharge container shown in FIG. 21 and a view showing the exterior portion as seen from an upper side.
Figure 23:
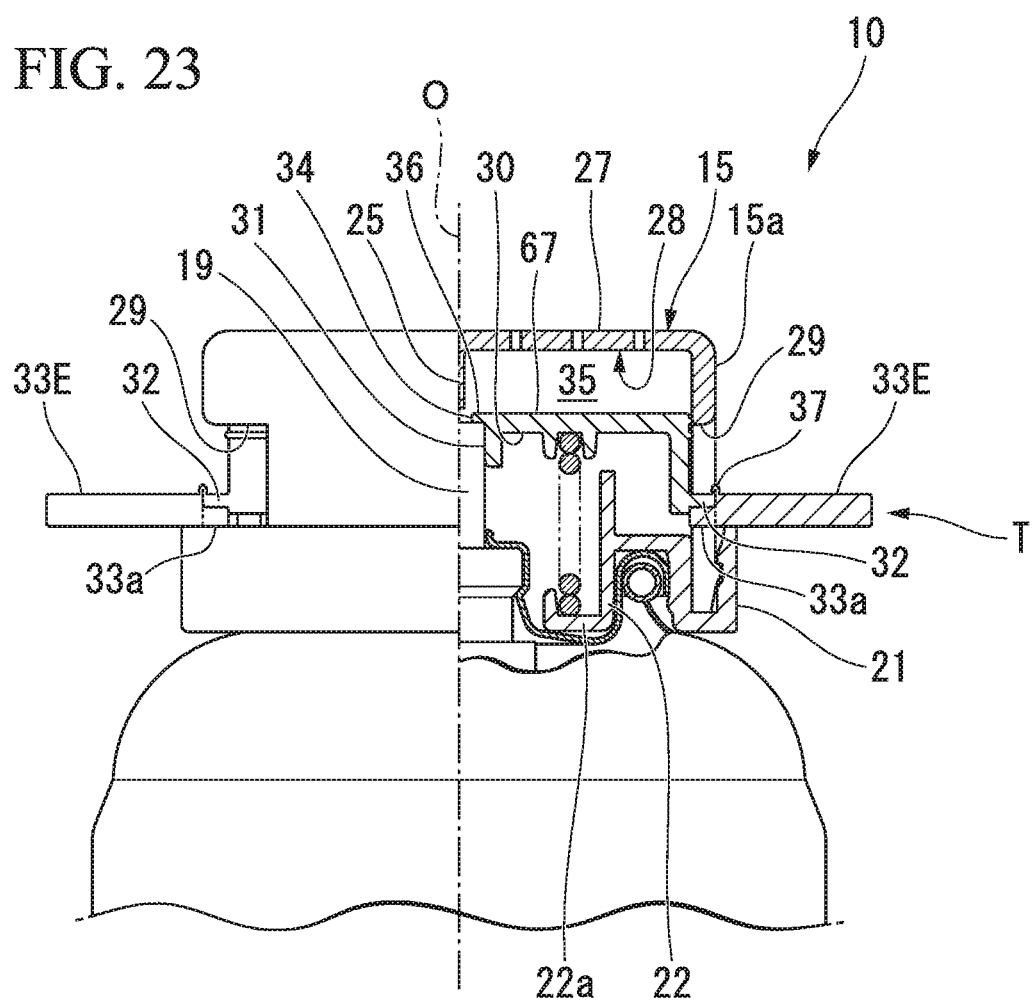
FIG. 23 is a longitudinal half sectional view of a main part of the discharge container shown in FIG. 21 and is a view showing a state in which the inner plate has moved down to a discharge position.

The inner plate 67 moves in the vertical direction between an upper standby position in which the supply surface 28 is in contact therewith or close thereto as shown in FIGS. 21 and 22 and a lower discharge position in which the stem 19 is moved down to supply the contents from the stem 19 into a diffusion chamber 35 as shown in FIG. 23. As shown in FIGS. 21 and 22, when the inner plate 67 is located at the standby position, the core body 25 is inserted into the communication hole 34.

As shown in FIG. 23, in the discharge position, the inner plate 67 is spaced downward from the supply surface 28 and forms the diffusion chamber 35 between the supply surface 28 and the inner plate 67. The diffusion chamber 35 diffuses the contents from the stein 19 in the radial direction (a direction along the discharge surface 27 and the supply surface 28) between the inner plate 67 and the supply surface 28 facing downward in the top wall portion 24 so that the contents are supplied into each of the plurality of discharge holes 26B. The diffusion chamber 35 is disposed coaxially with the container axis O. The diffusion chamber 35 is formed in a flat shape that is larger in the radial direction than in the vertical direction. A part of a wall surface of the diffusion chamber 35 is formed by the supply surface 28.

The locking portion 36 which is locked to the stem 19 and moves down the stem 19 when the inner plate 67 is located at the discharge position is provided on the inner plate 67. The locking portion 36 is located at an opening circumferential edge portion of the communication hole 34 in the inner plate main body 30, comes into contact with the upper end edge of the stem 19 from the upper side as the inner plate 67 moves down, and moves down the stem 19. At this time, the communication hole 34 communicates the inside of the stem 19 with the diffusion chamber 35. At this time, the inner plate main body 30 of the inner plate 67 is located below the core body 25, and the core body 25 is disposed inside the diffusion chamber 35.

Figure 20:
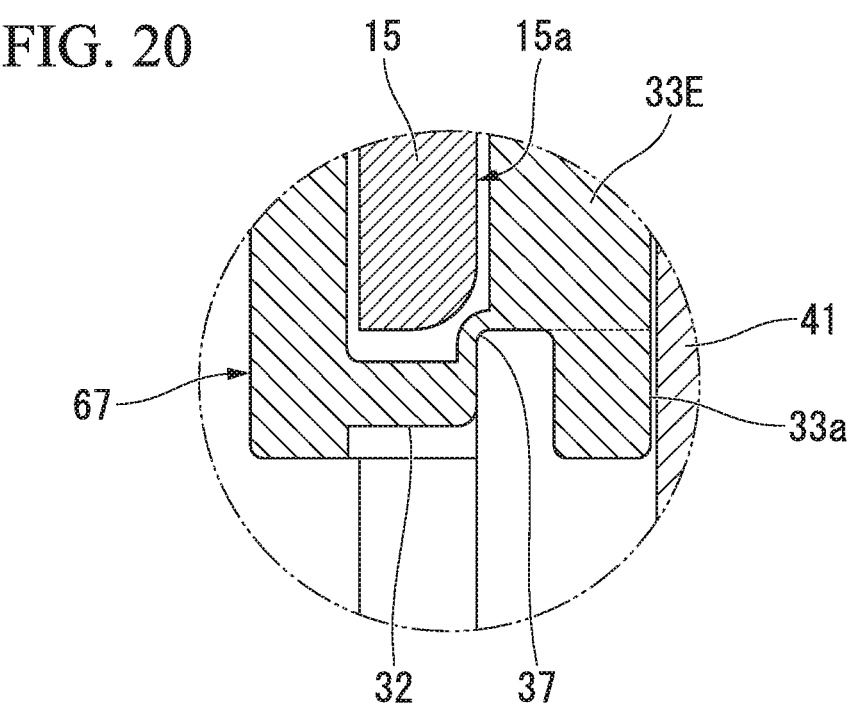
FIG. 20 is a longitudinal half sectional view of a main part of the inner plate of the discharge container shown in FIG. 18.

As shown in FIGS. 18 and 20, the pushing-down portion 77 that protrudes toward the outside in the radial direction is provided on the inner plate 67. The pushing-down portion 77 is disposed on the outside of the exterior portion 15 in the radial direction through the insertion hole 29 formed in the circumferential wall portion 15a of the exterior portion 15. The pushing-down portion 77 includes the locking protrusion portion 32, a hinge portion 37, and the pushing-down plate 33E.

A pair of locking protrusion portions 32 protrude toward the outside in the radial direction from the inner plate main body 30. The pair of locking protrusion portions 32 are provided at positions facing each other with the container axis O interposed between the positions. The locking protrusion portion 32 protrudes toward the outside of the exterior portion 15 through the insertion hole 29 of the exterior portion 15.

The pushing-down plate 33E extends in the vertical direction, and a lower end portion of the pushing-down plate 33E is connected to the locking protrusion portion 32 via the hinge portion 37, and the pushing-down plate 33E is disposed so that a front surface and a back surface thereof face in the radial direction. The pushing-down plate 33E is disposed on the outside of the exterior portion 15 through the insertion hole 29 formed in the circumferential wall portion 15a of the exterior portion 15, and the pushing-down plate 33E is also disposed to be movable around the hinge portion 37 and thus to achieve a use posture T (refer to FIGS. 21 to 23) in which the front surface and the back surface face upward and downward. In other words, the pushing-down plate 33E is provided so as to be capable being pushed down from the exterior in the use posture T and formed to protrude toward the outside in the radial direction from the locking protrusion portion 32. A locked protrusion portion 33a which is locked to a lower surface of the locking protrusion portion 32 in the use posture T is formed at a lower end portion of the pushing-down plate 33E.

The inner plate 67 is disposed to be rotatable with respect to the container body 11 in the circumferential direction, such that the pushing-down plate 33E moves forward and backward with respect to the gap 43 formed inside the restricting wall 41, and the rotational movement of the inner plate 67 with respect to the exterior portion 15 in the circumferential direction is restricted. That is, the inner plate 67 and the exterior portion 15 rotate together, in the circumferential direction.

A pushing member 50 formed of a spring member is provided between the fixing member 13 of the container body 11 and the inner plate 61. The pushing member 50 pushes and moves the inner plate 61 located at the discharge position upward to the standby position. An upper end portion of the pushing member 50 is in contact with a lower surface of the inner plate main body 30, and a lower end portion of the pushing member 50 is in contact with an upper surface of a flange portion 22a which protrudes toward the inside in the radial direction from the inner cylindrical portion 22 of the fixing member 13.

Next, an operation of the discharge container 10 according to the embodiment will be described.

In an initial state before use of the discharge container 10, the inner plate 67 is disposed at the standby position as shown in FIG. 18, and the pushing-down plate 33E is disposed in a state where it has entered the gap 43 between the circumferential wall portion 15a of the exterior portion 15 and the restricting wall 41 in the posture in which the from and back surfaces of the inner plate 67 are directed in the radial direction. At this time, the circumferential wall portion 15a and the restricting wall 41 restricts the movement of the pushing-down plate 33E in the radial direction, and the positioning wall 42 also restricts the movement of the pushing-down plate 33E to one side in the circumferential direction (the direction in which the pushing-down plate 33E enters the gap 43).

As shown in FIG. 21, when the contents are discharged onto the discharge surface 27 of the exterior portion 15, the inner plate 67 is rotated together with the exterior portion 15 to the other side in the circumferential direction with respect to the container body 11 to move the pushing-down plate 33E to a position which deviates from the gap 43 between the restricting wall 41 and the circumferential wall portion 15a of the exterior portion 15, and the pushing-down plate 33E is moved around the hinge portion 37 so that the front and back surfaces of the pushing-down plate 33E face upward and downward to be in the use posture T. Additionally, as shown in FIG. 23, the internal volume of the diffusion chamber 35 located between the top wall portion 24 of the exterior portion 15 and the inner plate 67 is increased and the locking portion 36 of the inner plate 67 is locked to the upper end portion of the stem 19 by pushing down the pushing-down plate 33E in the use posture T.

Further, as the inner plate 67 moves down, the stem 19 locked to the locking portion 36 moves down against the upward pushing force, and thus the contents in the container main body 12 flow into the diffusion chamber 35 through the stem 19. The contents which have flowed into the diffusion chamber 35 are diffused in the radial direction in the diffusion chamber 35 between the inner plate 67 and the supply surface 28 facing downward in the top wall portion 24, then supplied to the plurality of discharge holes 26B, and discharged onto the discharge surface 27 from the discharge holes 26B. After that, when the pushing-down operation of the pushing-down plate 33E is released, the inner plate 67 moves up with respect to the exterior portion 15 in accordance with the restoring displacement directed toward the upper side of the stem 19. At this time, the internal volume of the diffusion chamber 35 decreases, and the contents that have flowed into the diffusion chamber 35 are pushed out from the diffusion chamber 35 to the exterior through the discharge hole 26B.

As described above, according to the discharge container 10 of the embodiment, the contents in the container body 12 are diffused in the radial direction in the diffusion chamber 35, and then supplied to the discharge holes 26B. Therefore, it is possible to minimize concentration of the contents on the discharge holes 26B disposed in a specific part of the discharge surface 27 and to supply the contents to the discharge holes 26B with less variation. Accordingly, it is possible to minimize a variation in the discharge amount of the contents discharged onto the discharge surface 27 at each position.

Further, in the discharge container 10 of the embodiment, the pushing-down plate 33E is in the use posture only when the contents are discharged. Therefore, when the discharge container 10 is not in use, for example, in a distribution stage, the pushing-down plate 33E can be moved into and accommodated, in the gap 43 between the restricting wall 41 and the circumferential wall portion 15a of the exterior portion 15 with the front and back surfaces thereof facing in the radial direction. Accordingly, it is possible to reduce the dimension of the pushing-down plate 33E in the radial direction when the discharge container 10 is not in use.

On the other hand, it is possible to increase a length of the pushing-down plate 33E protruding toward the outside in the radial direction when the discharge container 10 is in use. Therefore, it is possible to easily push down the pushing-down plate 33E. Further, when the pushing-down plate 33E is set in the use posture T, the locked protrusion portion 33a of the pushing-down plate 33E is locked to the lower surface of the locking protrusion portion 32, and thus the downward rotation of the pushing-down plate 33E about the hinge portion 37 is restricted. Therefore, it is possible to surely move down the inner plate 67 by pushing down the pushing-down plate 33E.

Further, in the embodiment, when the pushing-down plate 33E is pushed downward in the state in which the inner plate 67 is located at the standby position, the inner plate 67 is moved down against the upward pushing force of the pushing member 50, the internal volume of die diffusion chamber 35 formed between the supply surface 28 of the exterior portion 15 and the inner plate 67 is increased, and the locking portion 36 of the inner plate 67 is locked to the stem 19. When the inner plate 67 is further moved down by the pushing-down operation, the locking portion 36 moves down the stem 19 against the upward pushing force as the inner plate 67 moves down, and the inner plate 67 is disposed at the discharge position and the contents in the container main body 12 flow into the diffusion chamber 35 through the stem 19.

After that, when the pushing-down operation of the pushing-down plate 33E is released, the upward pushing force of the inner plate 67 by the pushing member 50 and the upward pushing force of the stem 19 cause the inner plate 67 and the stem 19 to be moved upward and thus to be displaced and, restored, and the inner plate 67 is returned to the standby position. At this time, since the inner plate 67 is in contact with or close to the top wall portion 24 of the exterior portion 15, even if the contents remain in the diffusion chamber 35 before the inner plate 67 is moved upward, the contents are pushed out from the diffusion chamber 35 onto the discharge surface 27. That is, the inner plate 67 is restored and displaced to its upper initial position by releasing the pushing-down operation of the pushing-down plate 33E. Accordingly, since the contents remaining in the diffusion chamber 35 can be pushed out from the diffusion chamber 35, a remaining amount of the contents in the exterior, portion 15 can be reduced. In this way, for example, it is possible to make it easy to keep the inside of the exterior portion 15 clean by reducing the remaining amount of the contents in the exterior portion 15.

The technical scope of the present invention is not limited to the above-described embodiment, and various modifications can be made without departing from the spirit of the present invention.

For example, in the above-described embodiment, the positioning wall 42 is provided at one end on one side of the restricting wall 41 in the circumferential direction, but the present invention is not limited to such a constitution. For example, it is possible to omit this positioning wall 42. Further, in the above-described embodiment, the rotation of the inner plate 67 with respect to the exterior portion 15 in the circumferential direction is restricted, and the inner plate 67 and the exterior portion 15 are integrally rotated in the circumferential direction, but the present invention is not limited to such a constitution. For example, the inner plate 67 may be disposed to be rotatable with respect to the container body 11 and the exterior portion 15 in the circumferential direction.

Furthermore, the discharge container may not only discharge the contents onto the discharge surface 27 but also form a molded object on the discharge surface 27. For example, it is possible to appropriately change the number and shape of the discharge holes according to a shape of the molded object to be molded by the discharge container, the application of the contents to be discharged, and so on. For example, one discharge hole may be provided.

In the above-described embodiment, the aerosol can is adopted as the discharge container main body 20, but the present invention is not limited to such a constitution. For example, it is also possible to adopt a constitution having the discharger 14 having a pump mechanism as the discharge container main body 20.

Although the container main body 12 and the fixing member 13 are provided separately from each other in the container body 11, the container main body 12 and the fixing member 13 may be integrally provided. In the above-described embodiment, the restricting wall 41 and the positioning wall 42 are connected to the fixing member 13, but they may be connected to the container main body 12.

Besides, within the scope not deviating from the spirit of the present invention, it is possible to replace the elements in the above-described embodiment with known elements as appropriate, and the above-described modifications may be appropriately combined.

INDUSTRIAL APPLICABILITY

According to the present invention, it is possible to prevent the contents from adhering to hand or spilling out when the contents are discharged.

REFERENCE SIGNS LIST 1, 2, 3, 4, 5, 6, 10 Discharge container
11 Container body
12a Mouth portion
14 Discharger
15 Exterior portion
15a Circumferential wall portion
19 Stem
24 Top wall portion
26A, 26B Discharge hole
27 Discharge surface
28 Supply surface
29 Insertion hole
30 Inner plate main body
32 Locking protrusion portion
35 Diffusion chamber
36 Locking portion
37 Hinge portion
38 Coupling plate
39A, 39B Side plate
41 Restricting wall
43 Gap
50 Pushing member 61, 67 Inner plate
71, 72, 73, 74, 75, 76, 77 Pushing-down portion
T Use posture

The invention claimed is:

1. A discharge container comprising:
   a container body in which contents are stored;
   a discharger including a stem provided upright in a mouth portion of the container body to be movable downward in a state where the stem is pushed upward;
   an exterior portion including a top wall portion that is disposed above the stem and through which a discharge hole passes in a vertical direction, the exterior portion being configured to discharge the contents from the discharge hole to a discharge surface of the top wall portion facing upward;
   an inner plate provided in the exterior portion to be movable, the exterior portion being attached to the container body, the inner plate forming a diffusion chamber configured to diffuse the contents from the stem in a radial direction and supply the contents to the discharge hole, between the inner plate and a supply surface facing downward in the top wall portion; and
   a locking portion configured to be locked to the stem and to move down the stem as the inner plate moves down and a push-down portion protruding toward an outside in a radial direction are provided on the inner plate, the pushing-down portion being disposed on an outside of the exterior portion through an insertion hole formed in a circumferential wall portion of the exterior portion.

2. The discharge container according to claim 1, wherein:
   the inner plate includes an inner plate main body disposed in the exterior portion, and
   the pushing-down portion includes:
   a side plate that has a front surface and a back surface that extend along an outer circumferential surface of the exterior portion,
   a pushing-down plate that protrudes toward the outside in the radial direction from the side plate, and the pushing-down plate has a front surface and a back surface that are directed in the vertical direction, and
   a coupling plate that connects the side plate with the inner plate main body and is inserted into the insertion hole.

3. The discharge container according to claim 2, wherein the pushing-down plate is disposed over an entire circumference of the circumferential wall portion of the exterior portion.

4. The discharge container according to claim 1, wherein:
   the pushing-down portion includes a locking protrusion portion, and a pushing-down plate that extends in the vertical direction, the pushing-down plate having a lower end portion that is connected to the locking protrusion portion via a hinge portion, and the pushing-down plate has a front surface and a back surface that are directed in the radial direction,
   the pushing-down plate is disposed on the outside of the exterior portion through the insertion hole and is disposed to be movable around the hinge portion to be in a use posture in which the front surface and the back surface of the pushing-down plate are directed in the vertical direction,
   a locked protrusion portion configured to be locked to a lower surface of the locking protrusion portion when in a use posture is formed at the lower end portion of the pushing-down plate,
   a restricting wall disposed in a state in which a gap is formed between the restricting wall and the circumferential wall portion of the exterior portion is provided in the container body, and
   the inner plate is disposed to be rotatable with respect to the container body in a circumferential direction such that the pushing-down plate moves forward and backward with respect to the gap.

5. The discharge container according to claim 1, wherein:
   the inner plate is disposed to be movable between an upper standby position in which the inner plate is in contact with or close to the supply surface and a lower discharge position in which the locking portion is locked to the stem, and the stem is moved down to supply the contents from the stem into the diffusion chamber, and
   a pushing member that pushes the inner plate located at the discharge position upward to the standby position is provided between the container body and the inner plate.

* * * * *

UNITED STATES PATENT AND TRADEMARK OFFICE
CERTIFICATE OF CORRECTION

PATENT NO. : 10,946,574 B2  
APPLICATION NO. : 16/065472  
DATED : March 16, 2021  
INVENTOR(S) : Mai Kase Page 1 of 1

It is certified that error appears in the above-identified patent and that said Letters Patent is hereby corrected as shown below:

On the Title Page

Item (71), please change:
"YOSHINO KOGYOSHO CO., LTD., Tokyo (JP); Mai Kase, Tokyo (JP)"
To:
--Mai Kase, Tokyo (JP)--

Signed and Sealed this
Thirty-first Day of August, 2021

Drew Hirshfeld
*Performing the Functions and Duties of the*
*Under Secretary of Commerce for Intellectual Property and*
*Director of the United States Patent and Trademark Office*